(12) United States Patent
Hill et al.

(10) Patent No.: US 12,518,322 B1
(45) Date of Patent: Jan. 6, 2026

(54) SYSTEM AND METHOD FOR GENERATING A DIGITAL SHORTCUT

(71) Applicant: Nationwide Mutual Insurance Company, Columbus, OH (US)

(72) Inventors: Cameron Kelley Hill, Laguna Beach, CA (US); Julia Lee Barham, Shaker Heights, OH (US); Jonathan Stahl, Chicago, IL (US); Phil Sherman, Bondurant, IA (US); Craig Maas, Dublin, OH (US); Bradley Nowacki, Columbus, OH (US); Senthyl Prabu Arumugam, Powell, OH (US)

(73) Assignee: Nationwide Mutual Insurance Company, Columbus, OH (US)

(*) Notice: Subject to any disclaimer, the term of this patent is extended or adjusted under 35 U.S.C. 154(b) by 27 days.

(21) Appl. No.: 18/508,525

(22) Filed: Nov. 14, 2023

Related U.S. Application Data

(60) Provisional application No. 63/425,195, filed on Nov. 14, 2022.

(51) Int. Cl.
*G06Q 40/08* (2012.01)
(52) U.S. Cl.
CPC .................. *G06Q 40/08* (2013.01)
(58) Field of Classification Search
CPC .................................................... G06Q 40/08
USPC ............................................................. 705/4
See application file for complete search history.

(56) References Cited

U.S. PATENT DOCUMENTS

| | | | | |
|---|---|---|---|---|
| 10,949,928 | B1* | 3/2021 | Roll | G06Q 40/08 |
| 11,494,845 | B1* | 11/2022 | Hummel | G06N 20/00 |
| 2007/0288273 | A1* | 12/2007 | Rojewski | G06Q 10/0635 |
| | | | | 705/35 |
| 2015/0161738 | A1* | 6/2015 | Stempora | G06Q 40/08 |
| | | | | 705/4 |
| 2017/0255966 | A1* | 9/2017 | Khoury | B60W 40/00 |
| 2019/0188799 | A1* | 6/2019 | Kumar | G06Q 40/08 |
| 2019/0304607 | A1* | 10/2019 | Steele | G16H 50/30 |
| 2019/0318420 | A1* | 10/2019 | Summerson | G06Q 40/03 |
| 2021/0110480 | A1* | 4/2021 | Kwak | G07C 5/008 |

* cited by examiner

*Primary Examiner* — Robert R Niquette
(74) *Attorney, Agent, or Firm* — Taft Stettinius & Hollister LLP

(57) ABSTRACT

A method of generating a digital shortcut according to an embodiment includes receiving first user data inputted by a user, generating a first risk score range based on the inputted first user data, the first risk score range indicating an under-insured status relative to a predetermined threshold for at least one of a plurality of future insurance events, the under-insured status indicative of an expected loss, receiving second user data inputted by the user different from the first user data, refining the first risk score range to generate a second risk score range based on the inputted second user data, the second risk score range being a subset of the first score range, generating a digital shortcut selectable by the user and based on the second risk score range, updating a user account with a reduction in the expected loss, and displaying a protection score indicative of the reduction.

12 Claims, 19 Drawing Sheets

| Type of Insight | MVP 2 Insights | Types of Data Used |
|---|---|---|
| Location-specific | "Your home is located in an area that has higher claims & losses than compared to other areas in Ohio." | • Home type (condo, tenant, owner)<br>• Location<br>• Protective Devices<br>• Smoke/Fire Alarms<br>• Number of occupants<br>• Marital status |
| Liability-focused | "People who are married tend to have more liability claims and higher losses when they are homeowners." | |
| Weather events | "Did you know your area has an above average expected loss for lightning strikes compared to the rest of Ohio?" | |
| Theft | "Your home security system is great, though your risk and/or potential cost of theft is greater than some one who has a monitored security system." | |
| Type of Insight | Future insights we want to generate | Required Data |
| Location-specific + Weather | "Living in Kansas has the potential for frequent tornados, averaging 90 tornadoes annually over the past 30 years." | • Claims data |

Table 1

FIG. 14

| Type of Insight | MVP 2 Insights | Types of Data Used |
|---|---|---|
| Location-specific | "You live in an area with a higher likelihood and/or cost of collision than the Ohio average." | • Location<br>• Model Year<br>• Driver Class<br>• Household Composition |
| Car-specific | "Your car model year puts you at a lower expected loss when compared to newer vehicles." | |
| Multi-person policy | "The ages of others on your policy put you at a lower risk and/or out-of-pocket cost of an auto accident." | |

Table 2

FIG. 15

SYSTEM AND METHOD FOR GENERATING A DIGITAL SHORTCUT

CROSS-REFERENCE TO RELATED APPLICATIONS

This application claims priority to and the benefit of U.S. Provisional Application No. 63/425,195, titled "System and Method of Generating a Digital Shortcut," filed on Nov. 14, 2022, the contents of which are incorporated herein by reference in their entirety.

BACKGROUND

Users often rely on user interfaces and visualizations to seamlessly interact with various systems. For example, in a client-server arrangement, data may be served or otherwise provided to a client device by the server (e.g., or cloud functions in a serverless architecture) and displayed to the user for interaction therewith. User selections are provided to the server (or cloud functions), which results in updated content and/or other actions to occur based on the particular embodiment.

SUMMARY

One embodiment is directed to a unique system, components, and methods for generating a digital shortcut. Other embodiments are directed to apparatuses, systems, devices, hardware, methods, and combinations thereof for generating a digital shortcut.

According to an embodiment, a method of generating a digital shortcut may include receiving, via a user interface, first user data inputted by a user, the first user data including one or more of personal data, financial data, home data, and vehicle data, generating, via a computing system, a first risk score range based on the inputted first user data, the first risk score range indicating an under-insured status relative to a predetermined threshold for at least one of a plurality of future insurance events, the under-insured status indicative of an expected loss, the expected loss being a function of a loss probability and a loss value, receiving, via the user interface, second user data inputted by the user, the second user data being different from the first user data, refining, via the computing system and in response to receipt of the inputted second user data, the first risk score range to generate a second risk score range based on the inputted second user data, the second risk score range being a subset of the first score range, generating, via the computing system, a digital shortcut selectable by the user and based on the second risk score range, updating, in response to selection of the digital shortcut by the user, a user account with a reduction in the expected loss, and displaying, via the user interface, a protection score indicative of the reduction.

In some embodiments, the method may further include generating, via the computing system, a plurality of protection packages for selection by the user, the one or more protection packages providing coverage against one of the plurality of insurance events and being based on the risk score.

In some embodiments, the method may further include receiving, via the user interface, a selection of one of the plurality of protection packages, and generating, via the computing system, the protection score based on the selection of the one of the plurality of protection packages and the second risk score range, the protection score associated with a monetary coverage level of the selected one of the plurality of protection packages.

In some embodiments, the method may further include receiving, via the user interface, third user data inputted by the user, the third user data being different than the first user data and the second user data, and refining, via the computing system and in response to receipt of the inputted third user data, the second risk score range to generate a risk score based on the inputted third user data, the risk score being an element of the second score range.

In some embodiments, the method may further include generating, via the computing system, a plurality of protection packages for selection by the user, the one or more protection packages providing coverage against one of the plurality of insurance events and being based on the risk score, receiving, via the user interface, a selection of one of the plurality of protection packages, and generating, via the computing system, the protection score based on the selection of the one or the plurality of protection packages.

In some embodiments, the digital shortcut and the protection score may be simultaneously displayed on the user interface.

In some embodiments, the under-insured status may include a relationship of the user to other users within a predetermined geographical area.

According to another embodiment, a system of generating a digital shortcut may include at least one processor and at least one memory comprising a plurality of instructions stored thereon that, in response to execution by the at least one processor, causes the system to receive first user data inputted by a user, the first user data including one or more of personal data, financial data, home data, and vehicle data, generate a first risk score range based on the inputted first user data, the first risk score range indicating an under-insured status relative to a predetermined threshold for at least one of a plurality of future insurance events, the under-insured status indicative of an expected loss, the expected loss being a function of a loss probability and a loss value, receive second user data inputted by the user, the second user data being different from the first user data, refine, in response to receipt of the inputted second user data, the first risk score range to generate a second risk score range based on the inputted second user data, the second risk score range being a subset of the first score range, generate a digital shortcut selectable by the user and based on the second risk score range, update, in response to selection of the digital shortcut by the user, a user account with a reduction in the expected loss, and display a protection score indicative of the reduction via a user interface.

In some embodiments, the plurality of instructions may further cause the system to generate a plurality of protection packages for selection by the user, the one or more protection packages providing coverage against one of the plurality of insurance events and being based on the risk score.

In some embodiments, the plurality of instructions may further cause the system to receive a selection of one of the plurality of protection packages, and generate the protection score based on the selection of the one of the plurality of protection packages and the second risk score range, the protection score associated with a monetary coverage level of the selected one of the plurality of protection packages.

In some embodiments, wherein the plurality of instructions may further cause the system to receive third user data inputted by the user, the third user data being different than the first user data and the second user data, and refine, in response to receipt of the inputted third user data, the second risk score range to generate a risk score based on the inputted third user data, the risk score being an element of the second score range.

In some embodiments, the plurality of instructions may further cause the system to generate a plurality of protection packages for selection by the user, the one or more protection packages providing coverage against one of the plurality of insurance events and being based on the risk score, receive a selection of one of the plurality of protection packages, and generate the protection score based on the selection of the one or the plurality of protection packages.

In some embodiments, the digital shortcut and the protection score may be simultaneously displayed on the user interface.

In some embodiments, the under-insured status may include a relationship of the user to other users within a predetermined geographical area.

According to yet another embodiment, a system of generating a digital shortcut may include a client device configured to (i) receive first user data inputted by a user, the first user data including one or more of personal data, financial data, home data, and vehicle data, and (ii) receive second user data inputted by the user, the second user data being different from the first user data, and a cloud-based system configured to (i) generate a first risk score range based on the inputted first user data, the first risk score range indicating an under-insured status relative to a predetermined threshold for at least one of a plurality of future insurance events, the under-insured status indicative of an expected loss, the expected loss being a function of a loss probability and a loss value, (ii) refine, in response to receipt of the inputted second user data, the first risk score range to generate a second risk score range based on the inputted second user data, the second risk score range being a subset of the first score range, (iii) generate a digital shortcut selectable by the user and based on the second risk score range, and (iv) update, in response to selection of the digital shortcut by the user, a user account with a reduction in the expected loss, wherein the client device is further configured to display a protection score indicative of the reduction via a user interface of the client device.

In some embodiments, the cloud-based system may be further configured to generate a plurality of protection packages for selection by the user, the one or more protection packages providing coverage against one of the plurality of insurance events and being based on the risk score.

In some embodiments, the client device may be further configured to receive a selection of one of the plurality of protection packages, and the cloud-based system may be further configured to generate the protection score based on the selection of the one of the plurality of protection packages and the second risk score range, the protection score associated with a monetary coverage level of the selected one of the plurality of protection packages.

In some embodiments, the client device may be further configured to receive third user data inputted by the user, the third user data being different than the first user data and the second user data, and the cloud-based system may be further configured to refine, in response to receipt of the inputted third user data, the second risk score range to generate a risk score based on the inputted third user data, the risk score being an element of the second score range.

In some embodiments, the cloud-based system may be further configured to generate a plurality of protection packages for selection by the user, the one or more protection packages providing coverage against one of the plurality of insurance events and being based on the risk score, the client device may be further configured to receive a selection of one of the plurality of protection packages, and the cloud-based system may be further configured to generate the protection score based on the selection of the one or the plurality of protection packages.

In some embodiments, the digital shortcut and the protection score may be simultaneously displayed on the user interface.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIGS. 14-15 are tables of exemplary insights.

DETAILED DESCRIPTION

Figure 1:
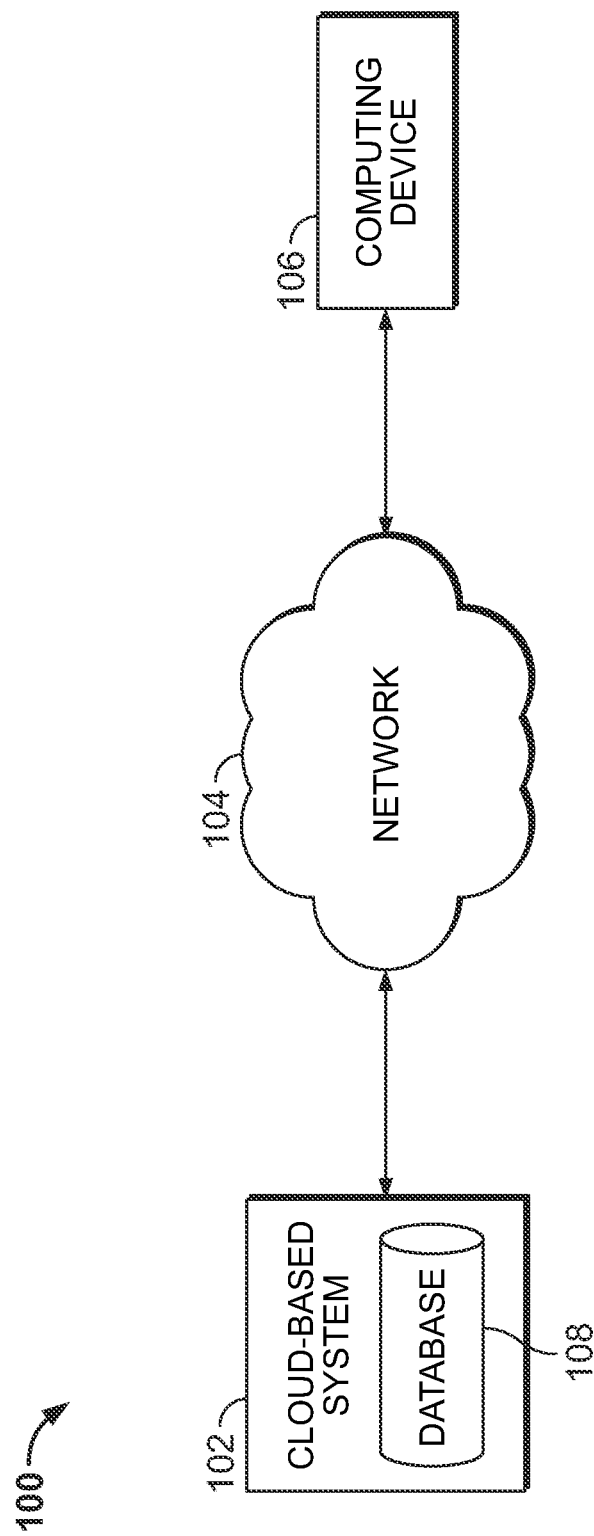
FIG. 1 is a simplified block diagram of at least one embodiment of a system for dynamically generating and displaying a protection index.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

It should be appreciated that the technologies described herein provide for the generation and dynamic display of digital shortcuts and protection scores via a dynamic display tool with which a user can interact. As described in greater detail below, in some embodiments, the system calculates analysis information provided by the user and generates a risk score related to the user having a future insurance event (e.g., bodily harm, collision, comprehensive, medical pay, property damage). A future insurance event may be an insurance event that results in an expense (e.g., out of pocket cost) to the user. For example, based on information provided by the user, the system calculates a risk score that the user will have to pay a monetary amount associated with various future insurance events (e.g., bodily harm, collision, comprehensive, medical pay, property damage).

In some embodiments, the risk score ranges from 0 to 100. The risk score may be associated with the user experiencing a future insurance event. The risk score may be indicative of a user having an under-insured status based on the user experiencing an insurance event. The risk score may be a quantification of an expected loss based on the user being under-insured for one or more future insurance events. The expected loss may be a function of a loss probability and a loss value. In some embodiments, the risk score indicates an under-insured status of the user relative to a predetermined threshold for the user experiencing a future insurance event. The risk score may represent an expected loss due to the user being under-insured and the expected loss may be an aggregate of the probability that the user experiences a loss and a value associated with the loss (e.g., loss value).

In some embodiments, the risk score is indicative of an expected loss related to a user being in an under-insured status and experiencing an insurance event. A risk score of 0 (e.g., minimum expected loss) means that the user has no risk of having expenses related to a future insurance event and a risk score of 100 (e.g., maximum expected loss) means that the user has a higher than average risk of having expenses (e.g., out of pocket expenses) related to a future insurance event. The risk score may be a comparison of the user against other individuals in the same geographical area or location (e.g., city, state, country). For example, a risk score of 50 may be indicative of average risk compared to other individuals in the same state as the user.

In some embodiments, the system generates a digital shortcut that can be engaged by the user. For example, upon determining the risk score of the user, the system may provide a digital shortcut to allow the user to select one or more protection packages (e.g., insurance products that provide varying levels of coverage). Each protection package may have a premium (e.g., cost) associated with it. Upon selection of a protection package, the system may generate a protection score based on the protection package selected. For example, a user may have a low risk score (e.g., under 33) and may receive a digital shortcut in response to the low risk. The digital shortcut may allow the user to select a protection package the provides good coverage (e.g., high coverage for various insurance events).

Upon selection of the digital shortcut, the system may generate a protection score related to the level of protection (e.g., insurance coverage) of a user. The protection score may indicate a status change of the user and/or the user associated data. For example, the protection score may indicate a reduction in the expected loss (e.g., better protection against the user experiencing a loss due to a future insurance event). In some embodiments, the protection score indicates a level of reduction in the expected loss. For example, a higher protection score means that the user is well protected against out of pocket expenses (e.g., expected loss) in association with a future insurance event (e.g., claim related to auto accident, home damage, bodily injury, medical, etc.). A higher protection score indicates a greater reduction in the expected loss (e.g., greater protection against an expected loss). In some embodiments, the protection score ranges from 0 to 100, and 100 is full protection where the user will not have to provide any out of pocket expense due to a future insurance event and that there is a full reduction (e.g., no expected loss) in the expected loss.

In some embodiments, the system provides a dynamic display tool to display the digital shortcut to the user. The dynamic tool may also display a risk score, a protection score, and a protection package. In some embodiments, the risk score is dynamically calculated while the user inputs information. For example, as the user inputs information regarding their house, car, family, and/or medical issues, the system may modify and refine the risk score. Upon generating the risk score, the system may generate a digital shortcut based on the generated risk score. The digital shortcut may provide to the user selectable financial products (e.g., one or more protection packages). The user may select one of the protection packages via the digital shortcut, which prompts the system to generate a protection score associated with the selected protection package.

In some embodiments, the protection score changes based on the protection package selected by the user. For example, in some embodiments, the system provides three digital shortcuts representing each of three protection packages. Each shortcut may be configured to update user associated data (e.g., user account data) that would associate the user with a different service package. Selection by the user of one of the digital shortcuts may result in an update to the user account data. The digital shortcuts may represent protection packages ranging from minimal coverage to high coverage due to an insurance event. As the user selects between the different digital shortcuts, the user associated data may change in real-time (e.g., up on selection of the digital shortcut). In some embodiments, the user associated data is a protection score associated with the user and based on the selected digital shortcut. The protection score indicates a reduction in the expected loss.

In some embodiments, the dynamic display tool allows a user to change information that they inputted to allow the user to see their risk score updated in real-time (e.g., upon entering their updated information or within 30 seconds of updating their information). For example, upon selection of the digital shortcut, the user associated data (e.g., user account data) may be updated. In some embodiments, the user associated data includes a protection score associated with the selected digital shortcut.

The dynamic display tool may be displayed on a user interface. The user interface may be the front end of a system and the system may also include a back end (e.g., processor, memories, etc.). The system may be configured to display the dynamic display tool on a user interface of a client device and allow for interaction with the dynamic display tool via the user interface. For example, a user may interact with the user interface to view the generated digital shortcut. In some embodiments, a user interacts with the user interface to view the generated digital shortcut and one or more of a risk score associated with the user and user associated data (e.g., user account data and/or a protection score).

Referring now to FIG. 1, a system 100 for generating and displaying a protection index includes a cloud-based system 102, a network 104, and a computing system 106. Additionally, the illustrative cloud-based system 102 includes a database 108. Although only one cloud-based system 102, one network 104, one computing system 106, and one database 108 are shown in the illustrative embodiment of FIG. 1, the system 100 may include multiple cloud-based systems 102, networks 104, computing systems 106, and/or databases 108 in other embodiments. For example, in some embodiments, multiple cloud-based systems 102 (e.g., related or unrelated systems) may be used to perform the various functions described herein. Further, in some embodiments, one or more of the systems described herein may be excluded from the system 100, one or more of the systems described as being independent may form a portion of another system, and/or one or more of the systems described as forming a portion of another system may be independent. For example, in some embodiments, one or more databases 108 may form a portion of the system 100.

The cloud-based system 102 may be embodied as any one or more types of devices/systems capable of performing the functions described herein. For example, in the illustrative embodiment, the cloud-based system 102 may be leveraged to generate a protection index/score for dynamic display to a user. For example, system 100 may be configured to provide a user with a tool for dynamically displaying a risk score and a protection score associated with the user's level of protection. Although the cloud-based system 102 is described herein in the singular, it should be appreciated that the cloud-based system 102 may be embodied as or include multiple servers/systems in some embodiments. Further, although the cloud-based system 102 is described herein as a cloud-based system, it should be appreciated that the system 102 may be embodied as one or more servers/systems residing outside of a cloud computing environment in other embodiments. In cloud-based embodiments, the cloud-based system 102 may be embodied as a server-ambiguous computing solution similar to that described below.

The illustrative database 108 is shown in FIG. 1 as forming a portion of the cloud-based system 102. However, it should be appreciated that the database 108 may be stored on another computing system in other embodiment. It should be appreciated that, depending on the particular embodiment, the database 108 may be embodied as any storage device, data structure, and/or system capable of storing the data described herein and/or otherwise performing the functions described herein. More specifically, in an illustrative embodiment, the database 108 is embodied as a non-relational database that is used to store one or more results or data received by the system 100 (or, more specifically, the cloud-based system 102).

In some embodiments, one or more devices of the system 100 are configured to pull data from external databases. For example, system 100 may be configured to pull data from multiple sources in a parallel manner to ensure real-time or near real-time updating to a dynamic display tool. In some embodiments, system 100 is configured to pull data in real-time based on information provided by the user. In some embodiments, system 100 may be configured to transform the received data to model/generate a risk score and/or a protection score. As described above, in some embodiments, a non-relational database may be used to store one or more results or data received by system 100. Further, in some embodiments, a non-relational database may be used to aggregate information from different sources (e.g., functions, servers, databases) to store information on the user (e.g., user associated data) and generate the risk score and/or the protection score for that user.

It should be appreciated that the system 100 may be configured to extract or otherwise receive data from multiple sources (e.g., internal data sources and/or third party data sources) depending on the particular embodiment. In some embodiments, the extracted or received data may initially be structured in a manner that is not associated with (or consistent with) the formatting utilized by the system 100. Accordingly, the system 100 may convert the data to a format associated with the system 100 (which may be a standardized form). For example, the system 100 may be configured to pull a first set of data from a first data source, a second set of data from a second data source, and third set of data from a third data source. The first set of data may be in a first format, the second set of data may be in a second format, and the third set of data may be in a third format. The system 100 may be configured to convert the first set of data from the first format to a fourth format, convert the second set of data from the second format to the fourth format, and convert the third set of data from the third format to the fourth format. In other words, the system 100 (e.g., the cloud-based system 102) may convert data received from disparate data sources and, potentially different data formats, into a single (or subset of) standardized data formats being used by the system 100.

The network 104 may be embodied as any one or more types of communication networks that are capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. In some embodiments, the network 104 may include a circuit-switched voice or data network, a packet-switched voice or data network, and/or any other network able to carry voice and/or data. In particular, in some embodiments, the network 104 may include Internet Protocol (IP)-based and/or asynchronous transfer mode (ATM)-based networks. In some embodiments, the network 104 may handle voice traffic (e.g., via a Voice over IP (VOIP) network), web traffic (e.g., such as hypertext transfer protocol (HTTP) traffic and hypertext markup language (HTML) traffic), and/or other network traffic depending on the particular embodiment and/or devices of the system 100 in communication with one another. In various embodiments, the network 104 may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The network 104 may enable connections between the various devices/systems 102, 106, 108 of the system 100. It should be appreciated that the various devices/systems 102, 106, 108 may communicate with one another via different networks 104 depending on the source and/or destination devices/systems 102, 106, 108.

The computing device 106 may be embodied as any type of device or system capable of executing an application and otherwise performing the functions described herein. For example, in some embodiments, the computing device 106 is configured to execute an application to dynamically view protection indexes, digital shortcuts, and/or other information provided by the cloud-based system 102. It should be appreciated that the application may be embodied as any type of application suitable for performing the functions described herein. In particular, in some embodiments, the application may be embodied as a mobile application (e.g., a smartphone application), a cloud-based application, a web application, a thin-client application, and/or another type of application. For example, in some embodiments, application may serve as a client-side interface (e.g., via a web browser) for a web-based application or service.

Figure 2:
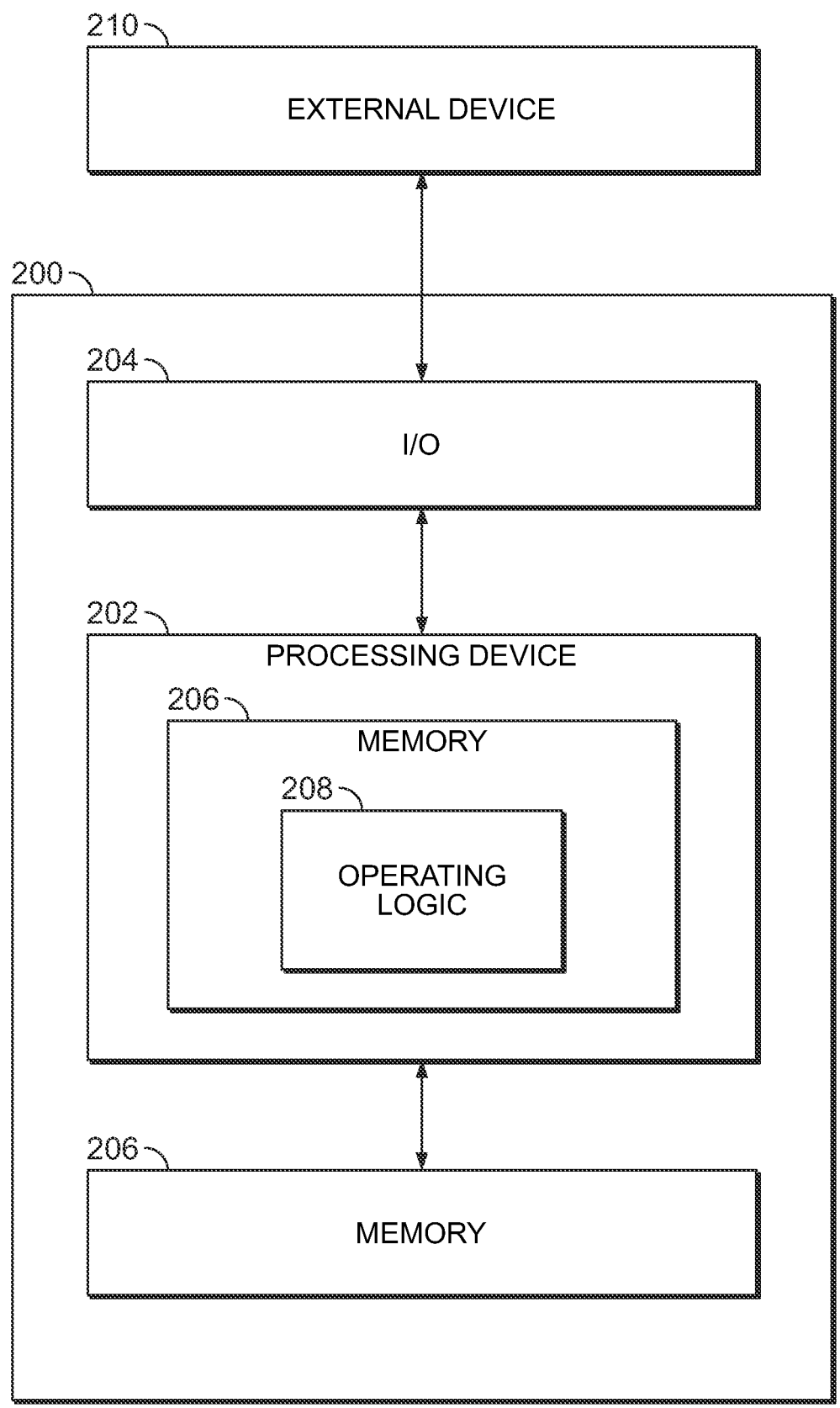
FIG. 2 is a simplified block diagram of at least one embodiment of a computing device.

It should be appreciated that each of the cloud-based system 102, the network 104, the computing system 106, and the database 108 may be embodied as, executed by, form a portion of, or associated with any type of device/system, collection of devices/systems, and/or portion(s) thereof suitable for performing the functions described herein (e.g., the computing device 200 of FIG. 2).

Referring now to FIG. 2, a simplified block diagram of at least one embodiment of a computing device 200 is shown. The illustrative computing device 200 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 200, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In various embodiments, the computing device 200 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as one or more of the devices/systems described herein, and/or a portion thereof. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

The computing device 200 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G)

mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 200 may communicate with other computing devices 200 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 200 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

Figure 3:
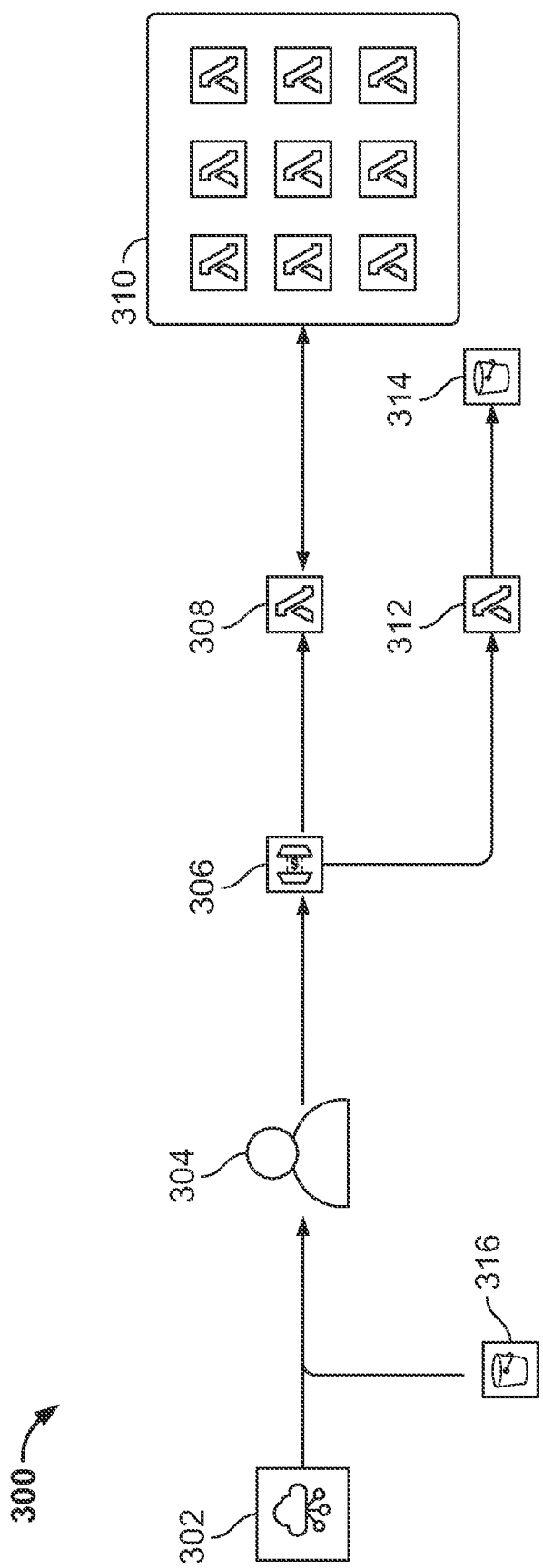
FIG. 3 is a simplified diagram of at least one embodiment of a serverless system architecture.

Referring now to FIG. 3, a serverless system architecture 300 that may be employed in conjunction with the system 100 involves a content delivery network (CDN) 302, a user 304, an application programming interface (API) 306, a profile function 308, serverless functions 310, a protection index function 312, and data stores 314, 316. In the illustrative embodiment, the CDN 302 may deliver a static website to the user 304, which may include a mechanism by which the user 304 can provide information updates. For example, in some embodiments, the CDN 302 may deliver a website to the user 304 (e.g., via the user's computing device 106 and/or from the data store 316) that provides forms that may be completed by the user 304 to update various user information (e.g., personal information, insurance information (e.g., personal, medical, property, etc.), and/or other relevant user-specific or user-relevant information). The user's information may be transmitted via the API 306 to the cloud-based system 102 (or other device of the system 100). For example, in some circumstances, the API 306 may invoke one or more calls to the profile function 308, which in turn may submit a series of events that invoke various other functions 310 to gather and process user data asynchronously. It should be appreciated that the profile function 308 may be a function associated with the user's profile, and may be configured to receive user data inputs and store and process user data or user-associated data. Further, the profile function 308 may be configured to interface with one or more databases to read/write/update user data (e.g., user-associated data) and/or third party systems to enhance the user experience, such as through auto-populating or auto-filling user information (e.g., vehicle information, residence information, etc.).

In some embodiments, the other functions 310 invoked to gather and process the user's information asynchronously may be sub-operations of the profile function 308. For example, the other functions 310 may be configured to save information associated with the user to the user's profile. The profile function 308 may be called while the user is still entering information via the website provided by CDN 302. In other circumstances, the API 306 may invoke one or more calls to the protection index function 312 to calculate and display a risk score and/or a protection score to the user (e.g., on the loaded website) based on the acquired data. In order to do so, in some embodiments, the protection index function 312 may access rate tables from the data store 314. In some embodiments, it should be appreciated that one or more of the functions 308, 310, 312 is a serverless function (e.g., a Lambda function) executed by the cloud-based system 102.

Figure 4:
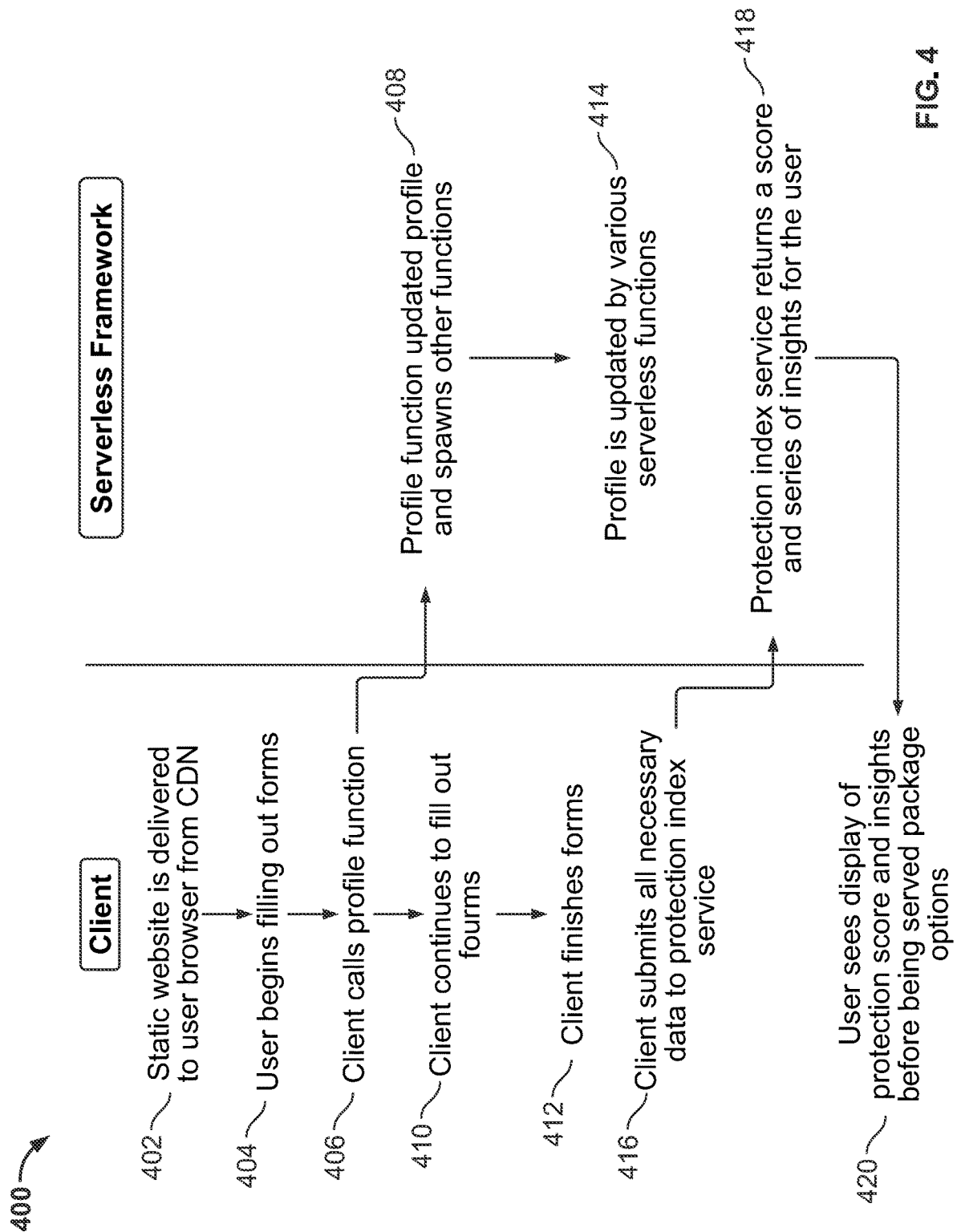
FIG. 4 is a simplified flow diagram of at least one embodiment of a method of dynamically generating and displaying a protection score.

Referring now to FIG. 4 in use, the system 100 (e.g., the cloud-based system 102, the computing system 106 (e.g., the client device), and/or other computing devices described herein) may execute a method 400 for dynamically generating and displaying a protection score. It should be appreciated that the particular flows of the method 400 are illustrated by way of example, and such flows may be combined or divided, added or removed, and/or reordered in whole or in part depending on the particular embodiment, unless stated to the contrary. It should be further appreciated that the method 400 may be executed using the serverless system architecture 300 of FIG. 3 in some embodiments.

The illustrative method 400 begins with flow 402 in which a static website is delivered to the user browser from the CDN. In flow 404, the user begins filling out forms on the static website, which prompts the client to call the profile function in flow 406. In response to calling the profile function, in flow 408, the serverless framework executes the profile function to update the user profile (e.g., with user data being supplied by the user via the form) and spawns other functions. In flow 410, the user continues to fill out the forms on the static website and, in flow 412, ultimately finishes the forms. In flow 414, the serverless framework updates the user profile through execution of various serverless functions. In flow 416, the client calls the protection index service and submits all necessary data to the protection index service. In flow 418, the serverless framework executes the protection index service to return a protection score and one or more relevant insights to the user (e.g., insights related to adequacy of insurance coverage). In flow 420, the client device displays the protection score and insights to the user, and subsequently provides various package options to the user for selection.

Although the flows 402-420 are described in a relatively serial manner, it should be appreciated that various flows of the method 400 may be performed in parallel in some embodiments. It should be further appreciated that the method 400 illustrates the asynchronous nature of the communication and serverless function execution.

Figure 5:
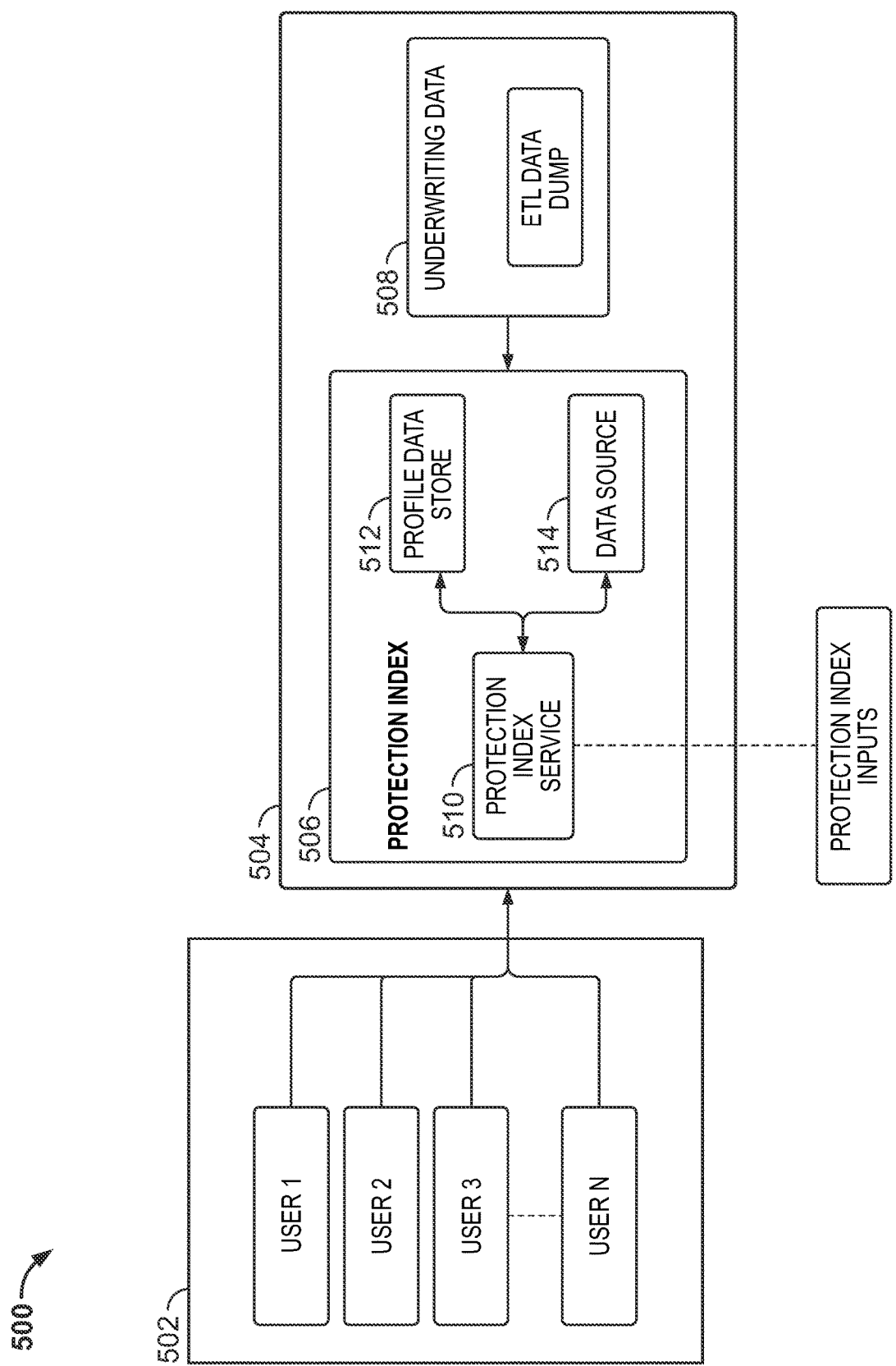
FIG. 5 is a simplified block diagram of at least one embodiment of a system for dynamically generating and displaying a protection index.

Referring now to FIG. 5, a system 500 for dynamically generating and displaying a protection index is shown. It should be appreciated that the system 500 may be an embodiment of the system 100 described above and, therefore, the systems 100, 500 may include similar components. As shown, the illustrative system 500 includes a front end 502 communicatively coupled to a back end 504. It should be appreciated that the front end 502 may include software executing on one or more user computing devices 106, which may include one or more interfaces for displaying the risk score and/or digital shortcut to the respective user. For example, a user may utilize the front end 502 to view a website generated and delivered by the back end 504, and to input information via a user interface.

For example, a user interface of the front end 120 may provide one or more fields for a user to input requested information. In some embodiments, the inputted information is stored and/or associated with the user associated data (e.g., user account data). For example, the system 500 may generate a user account associated with the user and the user-inputted information is stored as user-associated data and is associated with the user's account. The inputted information may be processed by the back end 504, which transmits a risk score, one or more digital shortcuts (e.g., digital shortcuts providing access protection packages), and protection scores associated with the protection packages to the front end 502 for display by the front end 502 to the user. The one or more digital shortcuts may represent protection packages that may each have a corresponding premium (e.g., monetary cost) associated with it. In some embodiments, the back end 504 generates a plurality of digital shortcuts representing a plurality of corresponding protection packages, each having a different premium. In some embodiments, protection packages having a higher premium result in higher protection scores for the user. For example, selection of a digital shortcut representing a protection package having a higher premium may result in the system 500 updating the user-associated data to associate the user with having a greater amount of protection. The user interface may be leveraged to display the protection score associated with the user dynamically in view of the updated user associated data.

The back end 504 may include a protection index system 506 that is communicatively coupled to an underwriting data system 508. In some embodiments, the protection index system 506 may be configured to store and retrieve data from one or more databases (e.g., the database 108). The protection index system 506 may be configured to receive information from the front end 502 and categorize and map the received information. For example, the protection index system 506 may be configured to map one or more data tags/categories to each piece of data received from the front end 502. For example, the protection index system 506 may include data tags for the type of home ownership, zip code of residence, presence of smoke alarm and type, presence of security system and type, presence of sprinkler system/fire detection system and type, name of primary owner, age of primary owner, number of people living at the residence, marriage status of the primary owner, county where primary owner lives, gender of primary owner, number of drivers in the household, number of vehicles in the household, and/or age of the youngest driver in the household.

The illustrative protection index system 506 includes a protection index service 510, a profile data store 512, and a data source 514. In some embodiments, the protection index service 510 receives user data (e.g., user associated data) from the profile data store 512 such as the address, vehicles, occupants, and/or other data; retrieves or otherwise receives data (e.g., underwriting data) from the data source 514; and generates the digital shortcut and/or calculates the risk score and/or the protection score. In some embodiments, the profile data store 512 may be a database containing user data (e.g., user associated data) for generating/updating the user's profile. The data source 514 may be a database containing various specific data (e.g., underwriting data, pricing data, risk factor data, scoring data, etc.).

In some embodiments, the back end 504 is configured to receive user inputted information from the front end 502. For example, a user may input information into the front end 502, and the front end 502 may transmit the inputted information to the back end 504. The back end 504 may generate a user account associated with the user and associate (e.g. map) the inputted information to the user's account. The back end 504 may process the received information and compute/generate a risk score associated with the user based on the inputted information. The risk score may indicate an expected loss based on a user having an under-insured status (e.g., be under-insured), relative to a predetermined threshold, for a future insurance event. For example, the predetermined threshold may be a minimum expected loss (e.g., 0) or a maximum expected loss (e.g., 100) associated with the user having out of pocket expenses if the user experiences an insurance event. The expected loss may be a function of the probability the user experiences a loss and a value associated with the loss (e.g., a monetary value).

Based on the computed risk score, the back end 504 may generate one or more digital shortcuts that represent one or more protection packages and their associated monetary costs to the user. The back end 504 may transmit the digital shortcuts to the front end 502 for displaying by the front end 502 to the user. The front end 502 may receive a selection of one of the digital shortcuts and may transmit the selected digital shortcut (e.g., the digital shortcut representing the selected protection package) to the back end 504. The back end 504 may update the user account data based on the selected digital shortcut. In some embodiments, updating the user account data may include generating a protection score based on the selected digital shortcut and transmitting the protection score to the front end 502 for display to the user. For example, in some embodiments, the protection score may be dynamically updated based on or more user selections including, for example, the selected digital shortcut. It should be appreciated that the protection score may indicate a level of protection that the selected digital shortcut would provide the user if the user were to experience an insurance event (e.g., an expected loss).

In some embodiments, the risk score indicates an expected loss based on the user having under-insured status relative to a predetermined threshold (e.g., having an out of pocket expense) for one or more future insurance events. In some embodiments, the risk score may range from 0 to 100.

In some embodiments, the predetermined threshold is 100 and a risk score under 100 indicates a quantification of an expected loss (e.g., that the user will have an out of pocket expense (e.g., having an under-insured status) if they experience one or more insurance events). For example, a user may receive a risk score of 20 indicating that they are at a low risk of having an out of pocket expense associated with a future insurance event occurring. In some embodiments, a plurality of bands or categories/classifications of risk scores may be used. For example, in an embodiment, a risk score of 0 to 33 may be classified as a low risk, a risk score of 34 to 66 may be classified as a medium risk, and a risk score of 67-100 may be classified as a high risk.

In some embodiments, the back end 504 generates one or more insights (e.g., recommendations, facts, trivia, and/or other relevant data) to be provided to a user based on the user's generated risk score. For example, once the back end 504 generates a risk score, the back end 504 may retrieve one or more stored insights from a database. The one or more stored insights may be mapped to different ranges of the generated risk score. For example, a low risk score (e.g., a risk score of 0-33) may be mapped to a first set of insights and a medium risk score (e.g., a risk score of 34-66) may be mapped to a second set of insights, different than the first set of insights. The insights may be transmitted to the front end 502 for display to a user via the user interface.

The one or more insights may be generated based on underlying individual insurance categories (e.g., insurance events) within the risk score. For example, for an insurance event related to a vehicle, the insights may be derived from individual calculations of each insurance event (e.g., bodily injury, collision, comprehensive, medical payment, and property damage). Depending on the particular embodiment and/or circumstances, there may be one, multiple, or no insights for each of insurance event or category. In some embodiments, the one or more insights are factors that increase or decrease the overall risk score of the user. The insights may be generated to provide the user with an explanation of why a certain risk score was generated and provided. In some embodiments, these insights may be actionable or interactive. For example, an insight may allow a user to interact with it to update the user associated data.

In some embodiments, the insights may be generated at a more granular level than the risk score. The risk score may be an aggregate of scores across various insurance events (e.g. bodily injury, liability, collision, etc.), whereas some insights may be based on a single or a specific insurance event. In an example, a user may have a below-average risk of collision and an above average risk of bodily injury, which may result in a risk score of 51. The corresponding insights may provide additional information regarding the calculation of the risk score of 51 for the user. In some embodiments, however, the insights are not related to the risk score. For example, an insight may be transmitted to the front end 502, and the insight may be related to a user's vehicle and an increased or decreased risk of collision related to the vehicle type, make, model, and/or other vehicle characteristics.

In some embodiments, the user may only be provided with insights that are based on and/or otherwise relevant to financial products that a user has or is interested in. For example, in some embodiments, only auto-related insights are shown if the user has a vehicle and/or is considering vehicle insurance implications. In some embodiments, the insights are dependent on the risk score generated for a specific insurance event. For example, a risk score of 75 generated for a category or insurance event of bodily injury may result in an insight being generated that is specific to the risk score compared to other users' risk scores of the insurance event in a predetermined geographical area or location.

Exemplary insights are provided in Table 1 and Table 2, as depicted in FIG. 14 and FIG. 15, respectively. Table 1 and Table 2 provide the type of insight, a description of the insight provided, and types of data that are used to generate the insight.

In some embodiments, the back end 504 is configured to generate a first risk score associated with a first risk/protection/asset type (e.g., home, renting) and a second risk score associated with a second risk/protection/asset type (e.g., auto/vehicles). The back end 504 may transmit the first risk score and the second risk score to the front end 502 for display by the front end 502 to a user. A user may dynamically select between viewing the first score and the second score. For example, the front end 502 may receive an input from a user via the user interface to change the visualization of the first risk score to the second risk score. For example, a user may select the first type (e.g., the first risk score) and then select the second type (e.g., the second risk score).

In some embodiments, the back end 504 computes an overall risk score, which is a combination of the first risk score and the second risk score. In some embodiments, the back end 504 computes/generates more than two risk scores. A user may interact with the front end 502 to view the first risk score, the second risk score, the overall risk score, and/or other computed risk scores. A first set of insights may be associated with the first risk score, a second set of insights may be associated with the second risk score, and a third set of insights may be associated with the overall score. In some embodiments, one or more of the first set of insights, the second set of insights, and/or the third set of insights are different from each other. In other embodiments, the first set of insights, the second set of insights, and the third set of insights may overlap partially or completely (e.g., an insight from the first set of insights associated with the first risk score may be the same as an insight from the second set of insights associated with the second risk score).

Figure 6:
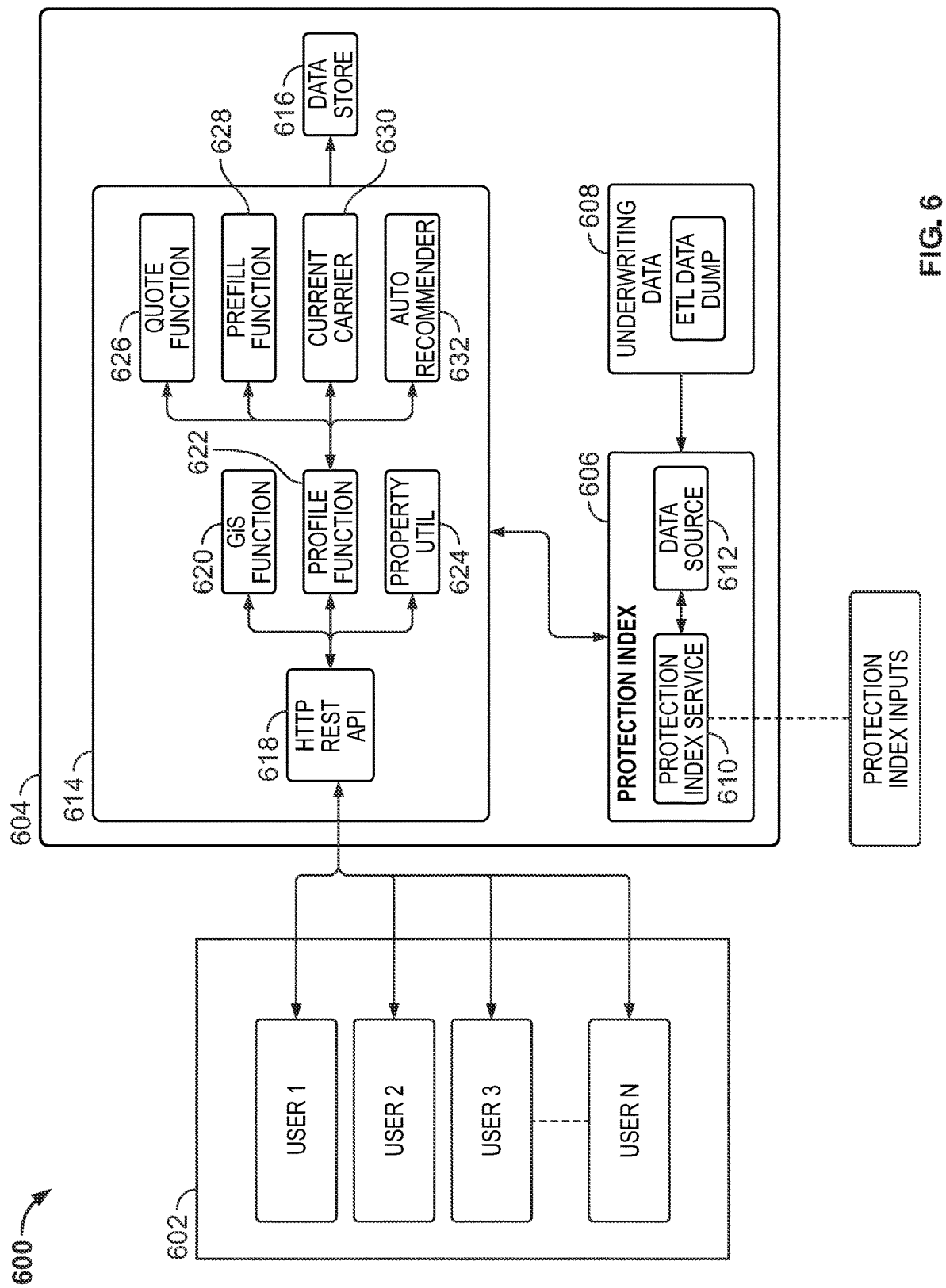
FIG. 6 is another simplified block diagram of at least one embodiment of a system for dynamically generating and displaying a protection index.

Referring now to FIG. 6, a system 600 for dynamically generating and displaying a protection index is shown. It should be appreciated that the system 600 may be an embodiment of the system 100 described above and/or an alternative embodiment of the system 500 of FIG. 5 and, therefore, the systems 100, 500, 600 may include similar components. As shown, the illustrative system 600 includes a front end 602 communicatively coupled to a back end 604. The front end 602 may be similar to the front end 502 of the system 500 of FIG. 5.

The back end 604 may include a protection index system 606 that is communicatively coupled to an underwriting data system 608. The illustrative protection index system 606 includes a protection index service 610 and a data source 612. In the illustrative embodiment, the protection index system 606, the underwriting data system 608, the protection index service 610, and the data source 612 are similar to the protection index system 506, the underwriting data system 508, the protection index service 510, and the data source 514 of FIG. 5, respectively. The back end 604 may also include a back end component 614 that is communicatively coupled to the protection index system 606 and a data store 616. The illustrative back end component 614 includes HTTP REST APIs 618, a GiS function 620, a profile function 622, a property utility 624, a quote function 626, a prefill function 628, a current carrier 630, and an auto recommender 632.

The HTTP REST APIs 618 may refer to one or more back end services associated with the back end 604 that receive inputs from the front end 602 (e.g. a mobile client) and perform operations (e.g., saving/updating data, retrieving and returning data, etc.). The GiS function 620 may be configured to validate data inputted by the user (e.g., inputted address of the user). The profile function 622 may be configured to store, pull, and generate data associated with the user (e.g., user associated data). In some embodiments, profile function 622 is configured to generate, populate, and update a profile associated with the user using user associated data. The profile may be generated by the back end 604 upon receiving information associated with the user from the front end 602. The profile function 622 may communicate with the quote function 622, the prefill function 628, the current carrier 630, and the auto recommender 632. It should be appreciated that the profile function 622 function may be configured to pull information about the user from one or more databases, such as third party databases. The property utility 624 may be configured to retrieve information about a user's mortgage or residential financial information to use for generating a risk score or determining eligibility for one or more financial products. The quote function 626 is configured to generate insurance data for users based on information inputted. The insurance data may include insurance quotes, premium information, policy limits, customizations, and/or other relevant data. The prefill function 628 may be configured to populate form fields for users, such as household members, vehicles, and/or other fields.

The current carrier 630 may be a service that retrieves/receive insurance data associated with the user (e.g., information about a user's current insurance carrier(s) and policy details). The auto recommender 632 may be a machine learning (ML) based and/or artificial intelligence (AI) based model that receives user data (e.g., user associated data) and generates an insurance package data indicative of an average user with similar user-associated data based on historical data. It should be appreciated that, in performing the various ML-related and/or AI-related functions described herein, the computing system may utilize neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning (ML) algorithms, models, techniques, and/or artificial intelligence technologies. Additionally, the number of AI/ML models used by the computing system may vary depending on the particular embodiment. For example, in some embodiments, a single AI/ML model may be used, whereas in other embodiments, multiple AI/ML models may be used.

In some embodiments, information inputted by the user at the front end 602 is transmitted to the back end 604 in real-time (e.g., upon inputting by the user) and associated with their user account. The back end 604 may receive information from the front end 602 and auto-populate the remaining fields presented to the user. For example, upon receiving a subset of data inputted by the user (e.g., their name and address), the back end 604 may receive personal data related to the user (e.g., age, gender, income, marital status, cars owned, etc.) and may auto populate input fields that are displayed to the user via the front end 602. In some embodiments, the back end component 614 receives data in one or more formats and converts the received data to a standardized format for quick transmission and retrieval as described above. For example, the back end component 614 may receive data (e.g., from the front end 602 and may convert the received data to a standardized format such that the back end component 614 can easily and efficiently process the data at a future time instead of converting the data upon each use (e.g., upon each retrieval and analysis).

In some embodiments, the system 600 includes queuing architecture to asynchronously process data to process information in real-time, and data is aggregated for rendering the results in real-time on the user interface (e.g., the front end 602). For example, the user makes requests to the back end 604 via the front end 602, and the requests may be sequenced and handled in the order that they are retrieved by the back end 604 asynchronously. The user can continue to interact with the front end 602 without waiting for responses from the back end 604.

Figure 7:
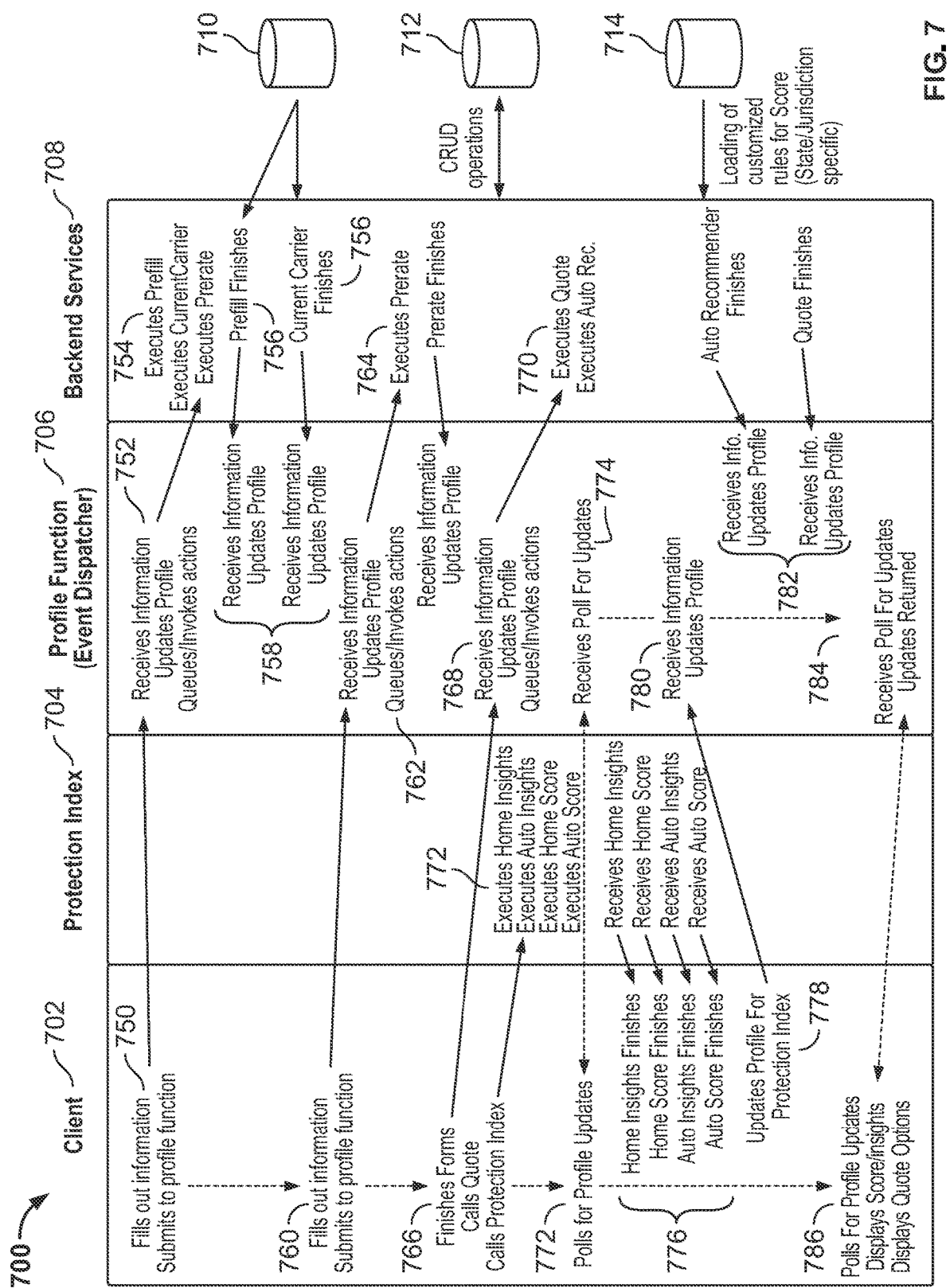
FIG. 7 is a simplified flow diagram of at least one embodiment of a system flow for asynchronously generating and displaying a protection score and updating a user profile.

Referring now to FIG. 7, a system flow 700 may be executed by the system 100 (e.g., the cloud-based system 102, the computing system 106 (e.g., the client device), and/or other computing devices described herein) for asynchronously generating and displaying a protection score and updating a user profile. It should be appreciated that the particular flows of the system flow 700 are illustrated by way of example, and such flows may be combined or divided, added or removed, and/or reordered in whole or in part depending on the particular embodiment, unless stated to the contrary.

The illustrative system flow 700 includes a client device 702 (e.g., the front end 502, 602 and/or the computing device 106), a protection index system 704 (e.g., the protection index system 510, 610), a profile function 706 (e.g., the profile function 308, the serverless functions 310, the protection index function 312, etc.), and a back end 708 (e.g., the back end 504, 604). The illustrative system flow 700 also involves a third party data source 710 that provides information on risk that may be used in the model (e.g., geography, etc.), an output data source 712 that stores the risk score, protection score, and/or other data output by the model, and an actuarial/pricing data source 714 that stores various actuarial and/or pricing models leveraged by the system 100.

The illustrative system flow 700 begins with flow 750 in which a user fills out information on a user interface (e.g., a fillable form) displayed on the client device 702 and transmits the information to the profile function 706. In flow 752, the profile function 706 receives the information, updates a profile associated with the user based on the information received from the user, and communicates with the back end 708 to invoke one or more services (e.g., prefilling an input field). In flow 754, the back end 708 executes one or more services (e.g., the prefill function, current carrier, pre-rate function, and/or other function). In flow 756, the back end 708 receives information from the third party data source 710 and/or other data sources, and transmits the received information to the profile function 706. In flow 758, the profile function 706 receives the information from the back end 708 and may update the profile associated with the user. In some embodiments, back end 708 retrieves third party data associated with the user resulting in the user having to input less information. For example, the third party data may be insurance data associated with the user, medical data associated with the user, vehicle data associated with the user, residence/housing data associated with the user, and/or other user-related data. In some embodiments, the third party data includes existing policy contract data for users who are not current policy holders.

In flow 760, the user continues to input information via the client device 702, and in flow 762, the profile function 706 receives the information and updates the user's profile (e.g., the user's account and/or user-associated data). In flow 764, the back end 708 may execute one or more pre-rate engines to begin generating and computing a risk score associated with the user.

In flow 766, the user continues and finishes inputting information and calls a quote and the protection index system 704 via the client device 702, and in flow 768, the profile function 706 receives the information and updates the user's profile (e.g., the user's account and/or user-associated data). In flow 770, the back end 708 may execute the quote and the auto recommender. In flow 772, the protection index system 704 generates one or more risk scores (e.g., a home score and/or auto score) and/or insights (e.g., home insights and/or auto insights).

In flow 774, the client device 702 polls the profile function 706 for profile updates, and in flow 776, the profile function 706 receives the poll. In flow 778, the insights and/or risk scores generated by the protection index system 704 are transmitted to the client device 702. In flow 778, the protection index system 704 updates the user profile for the protection index based on the generated risk scores and/or insights. In flow 780, the profile function 706 receives the updated information from the protection index system 704 and updates the user profile. In flow 782, the back end 708 receives the data associated with the executed quote and auto recommender, and updates the user profile based on that data. In flow 784, the profile function 706 receives the data returned in association with the poll for updates, and transmits the returned data to the client device 702. In flow 786, the client device 702 receives the profile updates associated with the poll, and displays the risk scores, insights, and/or quote options to the user. As described above, in some embodiments, the user may dynamically select one or more quote options, which may result in an update to the scores and/or insights.

Although the flows 750-786 are described in a relatively serial manner, it should be appreciated that various flows of the system flow 700 may be performed in parallel in some embodiments. It should be further appreciated that the system flow 700 illustrates the asynchronous nature of the communication and serverless function execution.

Figure 8:
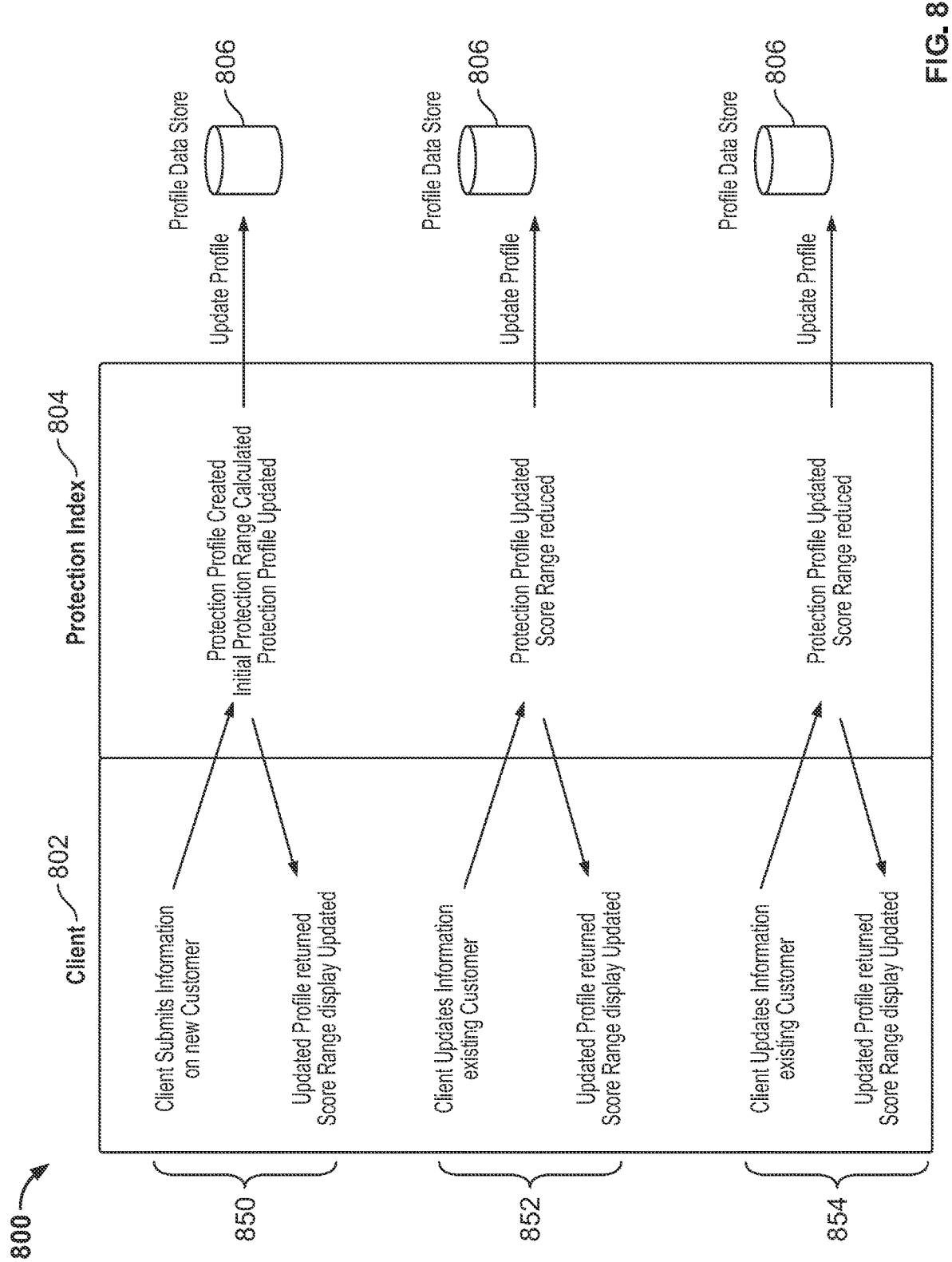
FIG. 8 is a simplified flow diagram of at least one embodiment of a system flow for generating a risk score while receiving data provided by the user.

Referring now to FIG. 8, a system flow 800 may be executed by the system 100 (e.g., the cloud-based system 102, the computing system 106 (e.g., the client device), and/or other computing devices described herein) for generating a risk score while receiving data provided by the user. It should be appreciated that the particular flows of the system flow 800 are illustrated by way of example, and such flows may be combined or divided, added or removed, and/or reordered in whole or in part depending on the particular embodiment, unless stated to the contrary.

The illustrative system flow 800 includes a client device 802 (e.g., the front end 502, 602 and/or the computing device 106), a protection index system 804 (e.g., the protection index system 510, 610), and a profile data store 806.

It should be appreciated that the system 800 may allow for repeated updating of the user information and corresponding refinements to the risk/protection score based on the updated information. The illustrative system flow 800 begins with flows 850 in which the protection index system 804 is configured to generate a risk score while receiving data provided by the user via the client device 802. For example, the protection index system 804 may be configured to generate a user profile and an initial risk score range based on initial information inputted by the user via the client device 802.

In flows 852, the user may continue to input additional information causing the protection index system 804 to automatically (e.g., without additional human intervention) refine the initial risk score range based on the inputted additional information. In some embodiments, the initial risk score range is refined in real-time (e.g., upon receipt of the inputted additional information).

In flows 854, the protection index system 804 may continue to refine the risk score range as the user inputs additional information. Upon completion of the user inputting information, protection index system 804 may generate a final risk score based on the completed inputted information. The protection index system 804 may store the final risk score and the completed user profile (e.g., the completed inputted information) in one or more databases (e.g., the profile data store 806). For example, initially a user may input their residence information and the protection index system 804 generates a first score range of 30-45. As the user inputs additional information (e.g., number of occupants, vehicle, smoke detectors, sprinklers, etc.), the protection index system 804 refines the first score range and generates a second score range of 33-36. Upon completion of the user inputting their information, the protection index system 804 may refine the second score range to generate a risk score of 35. In some embodiments, the protection index system 804 refines the second score range to generate a third score range, which may be a subset of the second score range.

In some embodiments, the protection index system 804 converts all the received information (e.g., all the user inputted information received from client device 802) into format of the system 100 (e.g., a format standardized for the system 100). In such embodiments, this may allow the protection index system 804 to quickly retrieve information for subsequent calculations. For example, a user may input information via the client device 802 and the protection index system 804 may receive the information as it is inputted by the user. The protection index system 804 may generate an initial risk score range and convert the received information from the client device 802 to a standardized format in addition to creating a profile based on the user (e.g., user associated data). The user may edit their profile to refine/update information. Upon receiving the refined/updated information, protection index system 804 may refine the risk score range quickly and efficiently using previously inputted information. The protection index system 804 may quickly and efficiently refine the risk score range since the protection index system 804 does not have to convert the previously received data upon each use of the received data.

The system 100 may be configured to update user associated data associated with a selected digital shortcut. For example, the system 100 may provide one or more digital shortcuts (e.g., protection packages) based on the generated risk score, as described above. Based on a selection of one of the digital shortcuts, the system 100 may update the user associated data with a protection score generated by the protection index system 804 based on the selected digital shortcut. The protection score may provide to the user how well the user is protected based on their risk score and the selected protection package.

In some embodiments, upon the client device 802 displaying the one or more risk scores (e.g., first risk score, second risk score, overall risk score) to the user, protection index system 804 and/or other component of the back end of the system 100 may generate one or more protection packages based on the one or more risk scores. The back end may transmit the one or more digital shortcuts (e.g., protection packages) to the client device 802 for display to the user. The user may select a digital shortcut (e.g., protection package) and the client device 802 may transmit the user's selection of the selected digital shortcut to the back end. Based on the one or more risk scores and the selected digital shortcut, the protection index system 804 may generate a protection score and transmit the protection score to the client device 802 for display to the user. The back end may update the user associated data with the protection score indicating that the user has a specific level of protection against being under-insured for a future insurance event. In some embodiments, the protection score may be based on the selected digital shortcut and the digital shortcut may be based on the risk score generated for the user.

In some embodiments, the one or more digital shortcuts presented to the user and selected by the user is dependent on the risk score generated by back end for the user, based on the user inputted information and information obtained from other databases (e.g., third party databases, internal databases). The protection index system 804 may communicate with one or more databases and based on user inputted information may obtain additional information associated with the user. For example, the protection index system 804 may receive a user's name and address and my obtain from one or more other databases information that the user has a security system, a fire detection system, and a highly safety rated car. Based on the information inputted by the user and obtained from the one or more databases, protection index system 804 may generate a low risk score for the user. Due to the low risk score, back end may also provide to the client device 802 one or more digital shortcuts that provide one or more protection packages that have relatively high protection scores, providing good protection for the user against being under-insured for a future insurance event. For example, upon selection of the digital shortcut, the back end may update the user's associated data (e.g., the user's account or profile) to indicate that the probability of the user being under-insured, relative to the predetermined threshold, for a future insurance event is reduce. The probability of the user being under-insured, relative to the predetermined threshold, for a future insurance event is reduced due to the user's selection of the digital shortcut, which represents a protection package providing coverage/protection against a future insurance event.

In some embodiments, the protection index system 804 may refine/update the protection score in real-time upon a user changing the selected digital shortcut (e.g., protection package) or a updating their profile, which results in a change to the risk score computed by the back end. It should be appreciated that references to "real-time" or "real time" are intended to include near real-time events. For example, in illustrative embodiments, events that occur in real-time may include events that occur within 15 seconds or 30 seconds of the user inputting their updated information or selecting a different digital shortcut.

Although the flows 850-854 are described in a relatively serial manner, it should be appreciated that various flows of the system flow 800 may be performed in parallel in some embodiments.

Figure 9:
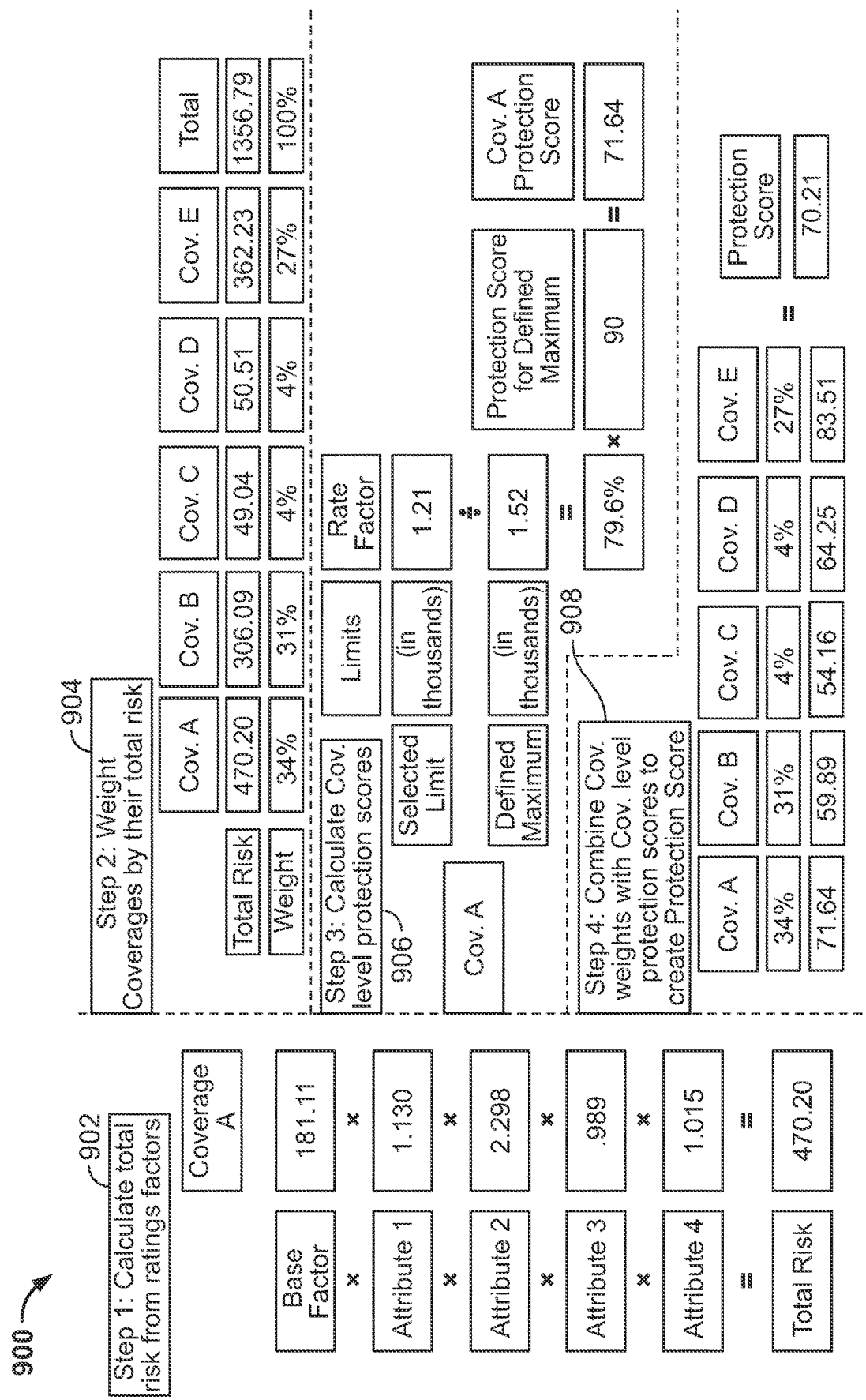
FIG. 9 is a simplified block diagram of at least one embodiment of a framework for generating a protection score based on the user's risk score.

Referring now to FIG. 9, a framework 900 for generating a protection score based on the user's risk score (e.g., and also a selected digital shortcut) is shown in conjunction with example data for the user. It should be appreciated that the framework 900 may be executed by and/or otherwise employed by the system 100 (e.g., the cloud-based system 102). As shown, the illustrative framework 900 involves four steps: a first step 902, a second step 904, a third step 906, and a fourth step 908.

As described below, the system 100 may generate a total monetary risk amount for each insurance event and apply weights to each total monetary risk amount. An event specific protection score may be calculated for each future insurance event based on the weighted monetary risk amounts and the selected digital shortcut (e.g., protection package). Each event specific protection score may be weighted accordingly and a protection score may be generated.

In the first step 902, the system 100 may generate a total risk amount for each insurance event or coverage (e.g., bodily injury, collision, comprehensive, medical payments, property damage, etc.). The total risk amount for a particular coverage may be calculated based on one or more rating factors, including a base rate and other attributes. More specifically, in various embodiments, the rating factors may include or be based on household rate factors, driver factors, vehicle age, vehicle, symbol, and/or other factors/attributes that may have an impact on the risk associated with the policy. In some embodiments, the total risk amount for the coverage may be an estimate of the total expected loss out of that coverage across the entire policy. As shown, in the illustrative embodiment, the first step 902 depicts calculations of the total risk amount based on a base factor and four relevant attributes for an example Coverage A, and the total risk amount is determined to be 470.20. It should be appreciated that the total risk value/amount may be calculated for each of the relevant coverages (e.g., Coverage A, Coverage B, Coverage C, Coverage D, and Coverage E in the illustrative embodiment) in the first step 902. In some embodiments, it should be appreciated that the total risk value/amount may be determined for each coverage in the policy.

In the second step 904, the risk of each coverage relative to the total risk of the policy is determined. In particular, in some embodiments, the system 100 determines the total risk amount across all coverages, for example, by summing the total risk values for each coverage determined in the first step 902, and determines the proportion or weight of that total overall risk that each coverage accounts for. In other words, the total risk amount for each insurance coverage/event (e.g., bodily harm, collision, comprehensive, medical pay, property damage) is weighted with respective to each other. For example, the corresponding weight of each insurance coverage/event relative to the overall risk is determined, such that the weight of all insurance events adds up to 100%. For example, in the illustrative embodiment, the total risk of Coverage A was determined in the first step 902 to be 470.02 and the total overall risk across all coverages was determined in the second step 904 to be 1356.79. The system 100 determines that Coverage A accounts for 34% of the total overall risk, and therefore is assigned a weight of 34%. In some embodiments, the total risk amount, which is dependent on the risk score generated by the system 100, may be used to generate the one or more digital shortcuts representing one or more protection packages described above.

As described herein, in some embodiments, each insurance event is associated with a coverage. For example, in an embodiment, Coverage A may correspond with bodily injury coverage, Coverage B may correspond with collision coverage, Coverage C may correspond with comprehensive coverage, Coverage D may correspond with coverage for medical payments, and Coverage E may correspond with coverage for property damage. Each coverage (e.g., insurance event) may have a weight associated with it as described above. For example, Coverage A may be an insurance event associated with bodily harm and may have a weight of approximately 10% to approximately 60%, approximately 20% to approximately 50%, or approximately 30% to approximately 40% in various circumstances. In some embodiments, Coverage A has a weight of approximately 35%+/−5%, such as 34%.

Coverage B may be an insurance event associated with a collision and may have a weight of approximately 10% to approximately 60%, approximately 20% to approximately 50%, or approximately 30% to approximately 40% in various circumstances. In some embodiments, coverage B has a weight of approximately 30%+/−5%, such as 31%. Coverage B may have a weight within 5-10% of Coverage A in some embodiments. For example, Coverage A may have a weight of approximately 34% and Coverage B may have a weight of approximately 31%. In some embodiments, the weight of Coverage A greater than the weight of Coverage B.

Coverage C may be an insurance event associated with comprehensive insurance and may have a weight of approximately 0% to approximately 25%, approximately 3% to approximately 20%, or approximately 5% to approximately 15% in various circumstances. In some embodiments, Coverage C has a weight of approximately 5%+/−5%, such as 4%. In some embodiments, the weight of Coverage C is less than the weight of Coverage A and/or Coverage B. Coverage C may have a weight that is a percentage of Coverage A and/or Coverage B in some embodiments. For example, Coverage C may have a weight that is 5-15% of the weight of Coverage A and/or Coverage B. For example, Coverage A may have a weight of approximately 34% and Coverage C may have a weight that is approximately 13% of the weight of Coverage A, such as approximately 4%. In some embodiments, the weight of Coverage C is within 30% of the weight of Coverage A and/or Coverage B. For example, Coverage A may have a weight of approximately 34% and Coverage C may have a weight of approximately 4%.

Coverage D may be an insurance event associated with a medical payments and may have a weight of approximately 0% to approximately 25%, approximately 3% to approximately 20%, or approximately 5% to approximately 15% in various circumstances. In some embodiments, Coverage D has a weight of approximately 5%+/−5%, such as 4%. In some embodiments, the weight of Coverage D is less than the weight of Coverage A and/or Coverage B. Coverage D may have a weight that is substantially the same as Coverage C. In some embodiments, the weight of Coverage D is within approximately 10% of the weight of Coverage C. Coverage D may have a weight that is a percentage of Coverage A, Coverage B, and/or Coverage C. For example, Coverage D may have a weight that is 5-15% of the weight of Coverage A and/or Coverage B. For example, Coverage A may have a weight of approximately 34% and Coverage D may have a weight that is approximately 13% of the weight of Coverage A, such as approximately 4%. In some embodiments, the weight of Coverage D is within 30% of the weight of Coverage A and/or Coverage B. For example, Coverage A may have a weight of approximately 34% and Coverage D may have a weight of approximately 4%.

Coverage E may be an insurance event associated with a property damage and may have a weight of approximately 10% to approximately 60%, approximately 20% to approximately 50%, or approximately 25% to approximately 35% in various circumstances. In some embodiments, Coverage D has a weight of approximately 25%+/−5%, such as a weight of 27%. In some embodiments, the weight of Coverage E is less than the weight of Coverage A and/or Coverage B and greater than the weight of Coverage C and/or Coverage D. Coverage E may have a weight that is a percentage of Coverage A and/or Coverage B. For example, Coverage E may have a weight that is 5-15% of the weight of Coverage A and/or Coverage B. For example, Coverage A may have a weight of approximately 34% and Coverage E may have a weight that is approximately 80% of the weight of Coverage A resulting in Coverage D having a weight of approximately 27%. In some embodiments, the weight of Coverage D is within approximately 30% of the weight of Coverage C and/or Coverage D. For example, Coverage C may have a weight of approximately 4% and Coverage E may have a weight of approximately 27%.

In some embodiments, the weights of Coverage A, Coverage B, and Coverage E are greater than the weights of Coverage C and Coverage D. In some embodiments, the weights of Coverage A, Coverage B, and Coverage E are within 10% of each other. The weights of Coverage C and Coverage D may be approximately 10-15% of the weights of Coverage A, Coverage B, and Coverage E. In some embodiments, the weights of Coverage A, Coverage B, and/or Coverage E are five to ten times greater than the weights of Coverage C and Coverage D.

In some embodiments, the weights of Coverage A, Coverage B, Coverage C, Coverage D, and Coverage E add up to approximately 100%. The weights of Coverage A, Coverage B, Coverage C, Coverage D, and Coverage E may be rounded up or down to the nearest whole number (or another decimal place) resulting in the sum of the weights of Coverage A, Coverage B, Coverage C, Coverage D, and Coverage E being 100%+/−5%.

In the third step 906, the system 100 may calculate an itemized coverage protection score for each insurance coverage (e.g., event category). For example, in the illustrative embodiment, the system 100 may calculate an itemized coverage protection score for each of Coverage A, Coverage B, Coverage C, Coverage D, and Coverage E. Further, in some embodiments, the system 100 may calculate the itemized overage protection scores based on the user selection of one of the digital shortcuts described herein. It should be appreciated that the itemized protection score for each insurance coverage (e.g., event category) may be calculated based upon the monetary coverage and/or monetary attributes associated with the selected protection package, along with one or more rating factors. In some embodiments, the itemized protection score is dependent on a maximum defined value (e.g., 100 or less than 100) provided the administrator of the system 100. The predefined maximum value may be the predefined maximum threshold associated with the risk score. For example, in some embodiments, an administrator of the system 100 may determine to set the maximum predefined threshold to a number less than 100, so as not to imply that the user is guaranteed against all out of pocket expenses due to an insurance event. Instead, the system administrator may predefine the maximum threshold/value for the protection score to be 90, and each itemized protection score may be reduced proportionally.

As described herein, in some embodiments, the risk score (e.g., the numerical non-monetary risk score generated based on the user inputted information) determines the digital shortcuts (e.g., protection packages) presented to the user for selection. Therefore, in such embodiments, it should be appreciated that the itemized protection scores may be dependent on the risk score.

In the fourth step 908, the system 100 determines an overall protection score based on the itemized protection scores determined in the third step 906. For example, in some embodiments, the system 100 may apply the corresponding weights to each of the itemized protection scores and sum to the weighted itemized protection scores to arrive at the overall protection score.

Figure 10:
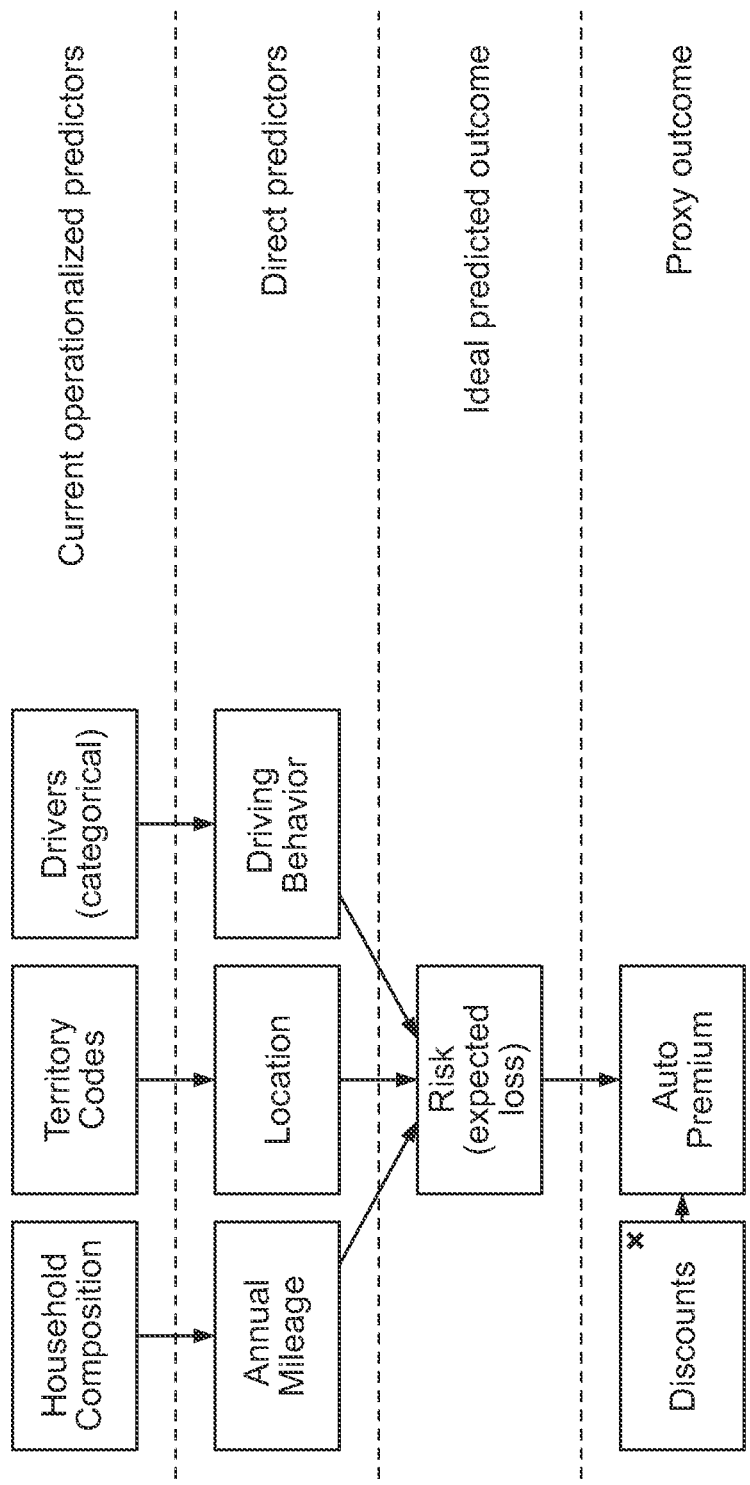
FIG. 10 is a simplified diagram of a conceptual representation of using predictors to generate a risk score.
Figure 11:
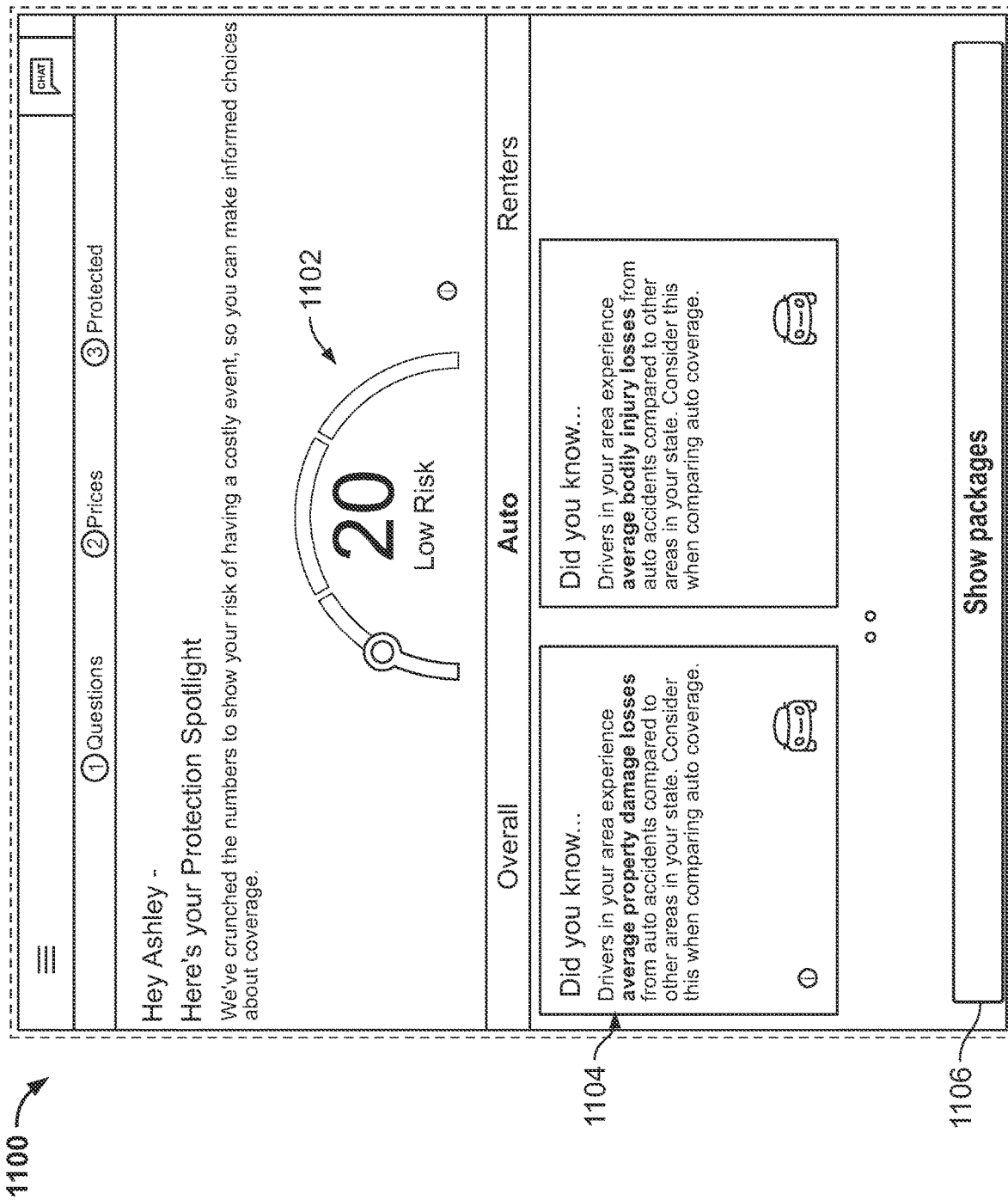
FIGS. 11 and 12A-12E illustrate various example states of a dynamic display tool.

Referring now to FIG. 10, a conceptual representation of using predictors to generate a risk score is shown. As shown, in some embodiments, operationalized predictors and/or direct predictors may be used to generate the risk score. For example, the operationalized predictors may include household composition, territory codes, and information related to drivers. Direct predictors may include annual mileage, location, and driving behavior, for example. It should be appreciated that the operationalized predictors may be used to proxy the direct predictors, which are analyzed to generate an ideal predicted outcome that is reflected in the proxy outcome. As described above, the risk score may be used to generate a protection package, and the protection package may include a premium associated with it. In some embodiments, the system 100 may determine whether discounts can be applied to reduce the cost associated with one or more protection packages. By way of one example related to auto pricing, a premium associated with a protection package may be computed as the product of the base rate (territory-based), driver class factor (multiple factors), distribution factors, and/or other factors. In some embodiments, the system 100 does not include factors that do not affect the premium of each protection package. For example, in some embodiments, the system 100 may not include distribution factors as they do not vary the premium associated with each protection package.

Referring now to FIGS. 11 and 12A-12E, various states of a dynamic display tool 1100 are shown. It should be appreciated that the dynamic display tool 1100 may be displayed to a user of a client device via a graphical user interface (e.g., the computing device 106).

In some embodiments, the dynamic display tool 1100 is configured to display to a user the risk score generated by the back end (e.g., the cloud-based system 102). In some embodiments, the dynamic display tool 1100 includes visual indicator 1102 to provide a visualization of the risk score generated by the back end.

The dynamic display tool 1100 may include one or more fields for the user to refine, update, or add information that may refine their risk score. For example, a user may input a first subset of information, which prompts the back end to generate a first risk score range. The user may input a second subset of information, which may refine, update, or add to the first subset of information. Upon inputting the second subset of information, the back end may generate a second risk score range, which may be smaller (e.g., a narrower range) than the first risk score range. In some embodiments, the second risk score range is a subset of the first risk score range. This process may continue until a single risk score is generated based on input of additional information by the user and iterative narrowing of the risk score range. For example, subsequent risk score ranges may be refined, each being a subset of the prior. A single risk score may be generated, the single risk score being an element of the prior subset.

The dynamic display tool 1100 may be configured to dynamically display the updated risk score and/or updated risk score ranges upon inputting of information by the user. For example, as the user inputs information and submits it via the dynamic display tool 1100, the dynamic display tool 1100 may automatically update (e.g., without human intervention) the risk score and/or risk score range as described herein. In some embodiments, the back end generates one or more insights 1104 that are displayed via dynamic display tool 1100. The insights 1104 may be associated with the risk score generated by the back end and displayed to the user via the dynamic display tool 1100. In some embodiments, the insights 1104 may be associated with the type of risk score being displayed (e.g., categorical: overall, home category, auto category). In some embodiments, using the dynamic display tool 1100, a user may select different types (e.g., categories) to change the risk score being presented.

The dynamic display tool 1100 may include an option 1106 that may be selected by the user to display one or more digital shortcuts (e.g., protection packages) based on the risk score generated by the back end. Upon selecting the option 1106, the back end may transmit one or more digital shortcuts associated with the risk score (e.g., overall risk score) to the dynamic display tool 110 as described above.

Referring now to FIGS. 12A-12E, the dynamic display tool 1100 may display digital shortcuts 1202, which may be based on the risk score generated by the back end. As described above, in some embodiments, each digital shortcut 1202 may represent a protection package having a corresponding premium. Further, each digital shortcut 1202 may include a score associated with it (e.g., protection score). For example, selection of a digital shortcut 1202 results in the system 100 updating user-associated data and presenting to the user a protection score. In some embodiments, the protection score indicates a status change of the user or a change/update to the user associated data (e.g., user's account data and/or user's profile). For example, the protection score may indicate a reduction in the probability that the user would be under-insured for a future insurance event (e.g., relative to a predetermined threshold).

Figure 12A:
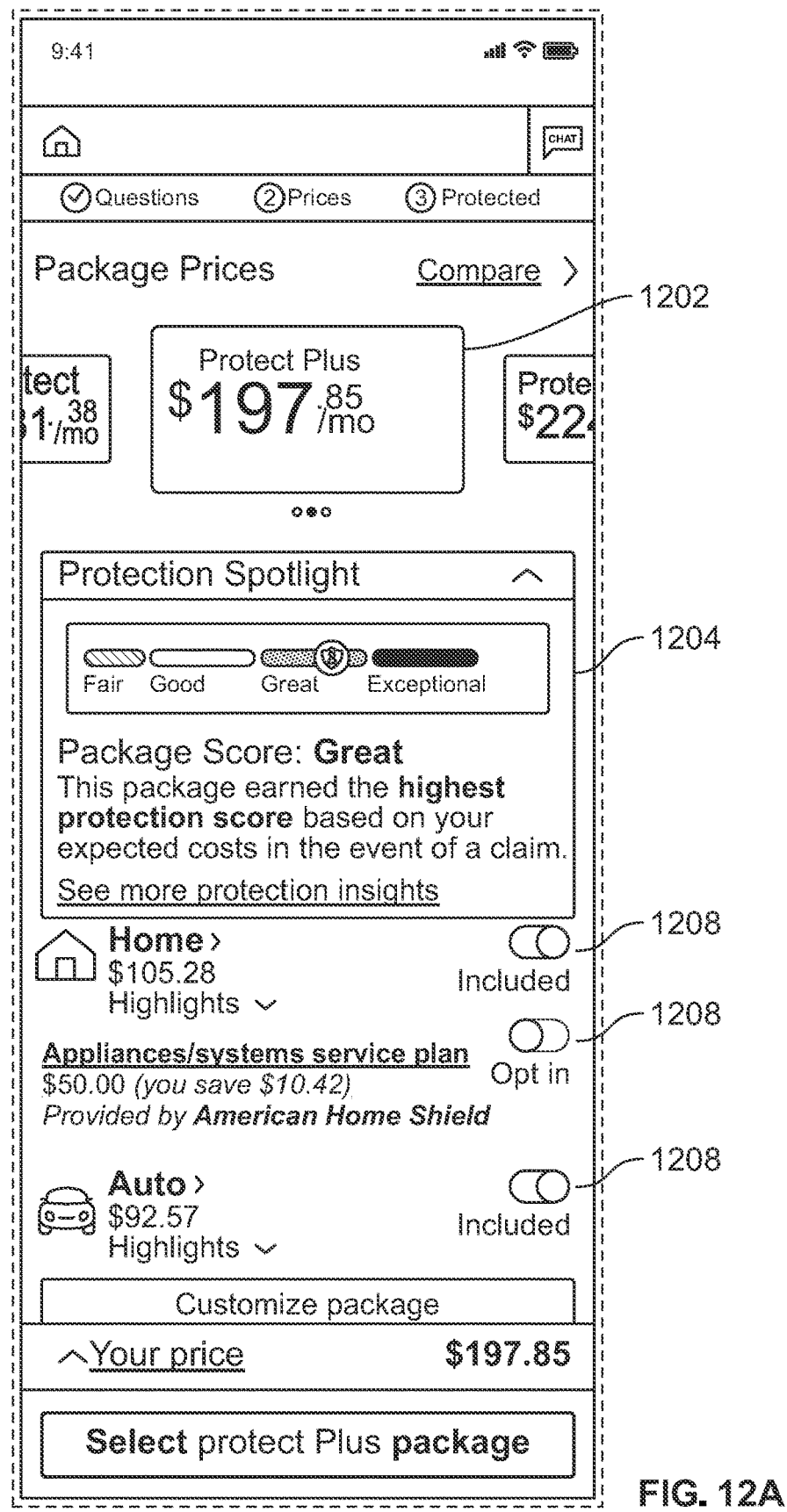
Figure 12B:
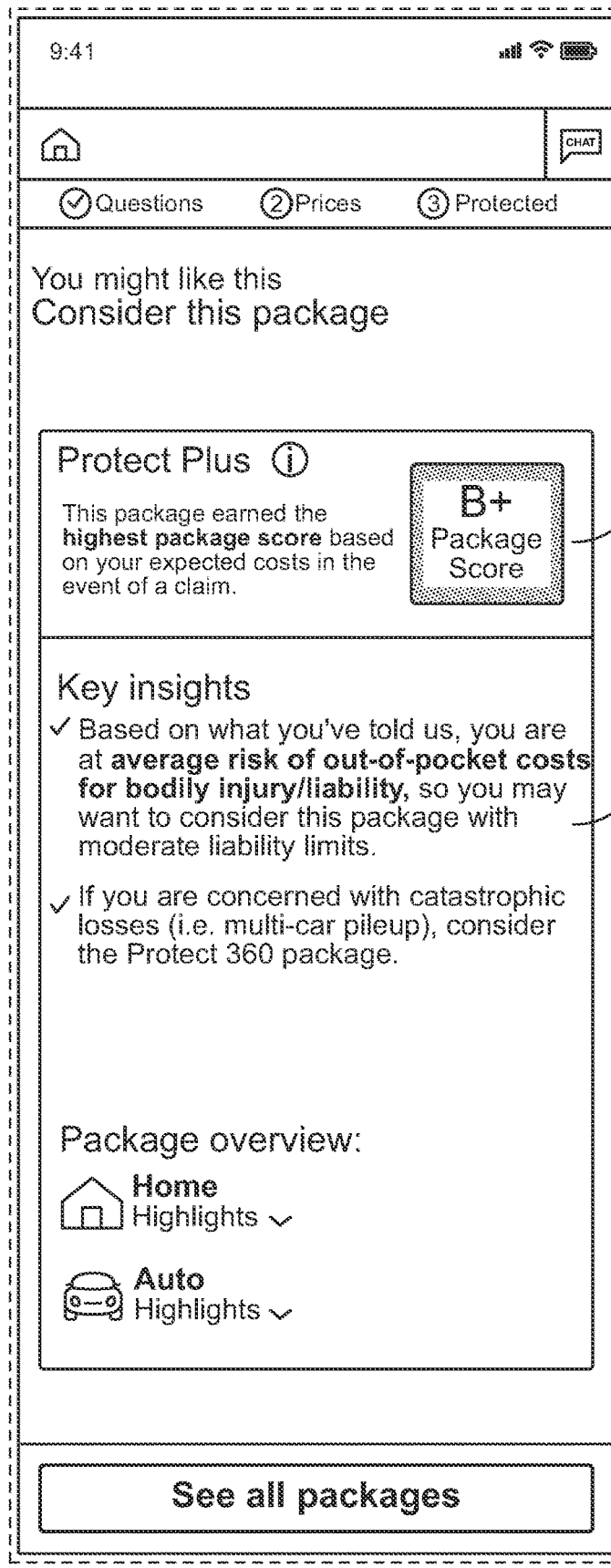
Figure 12C:
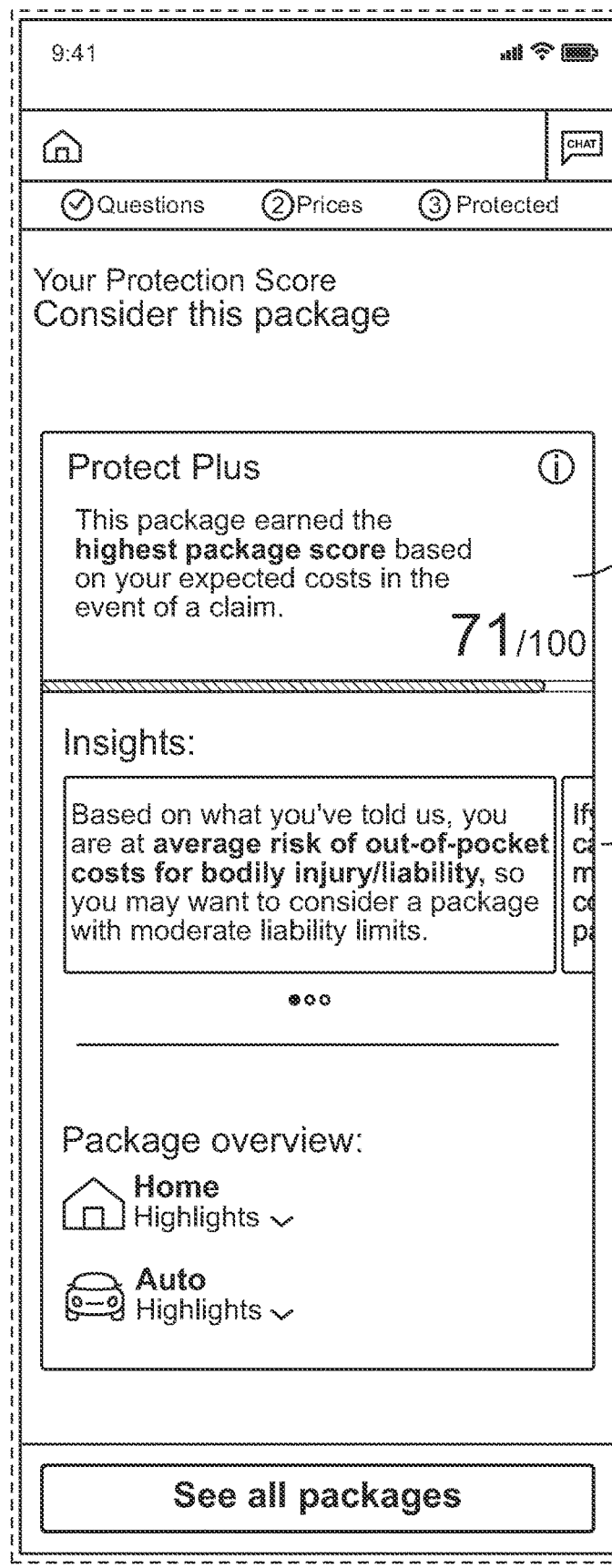
Figure 12D:
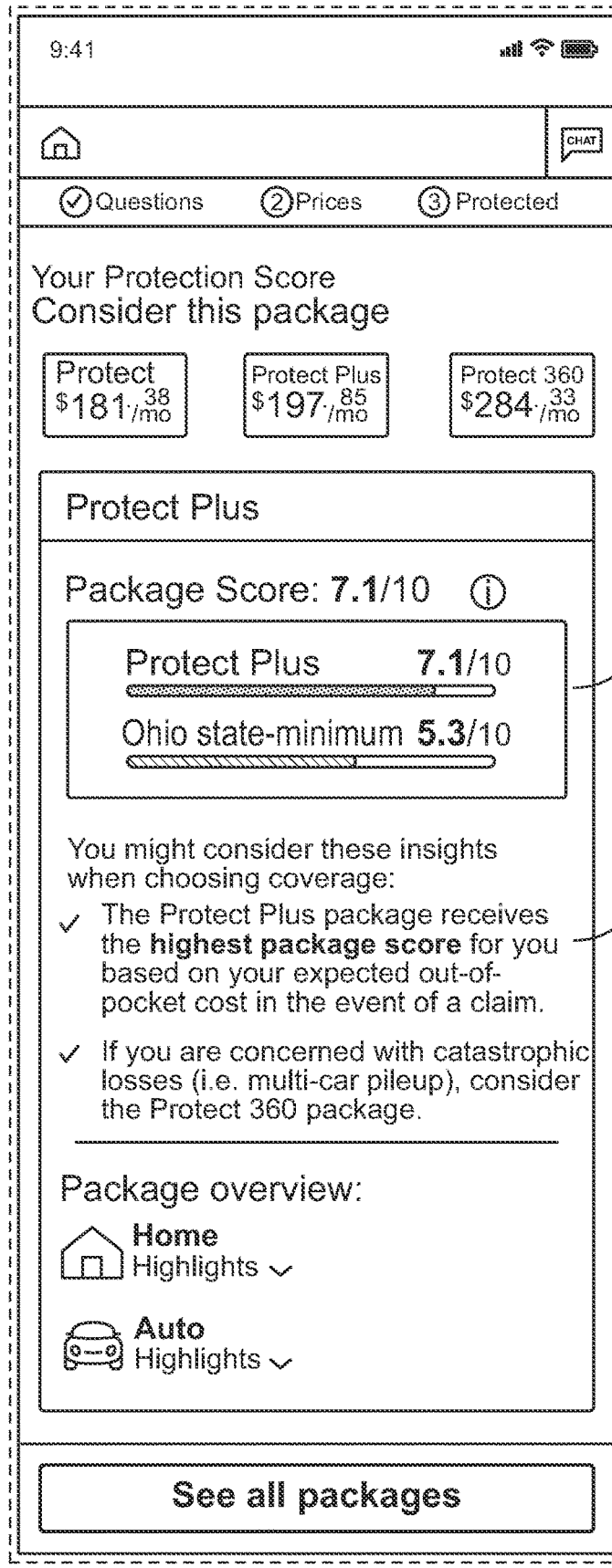
Figure 12E:
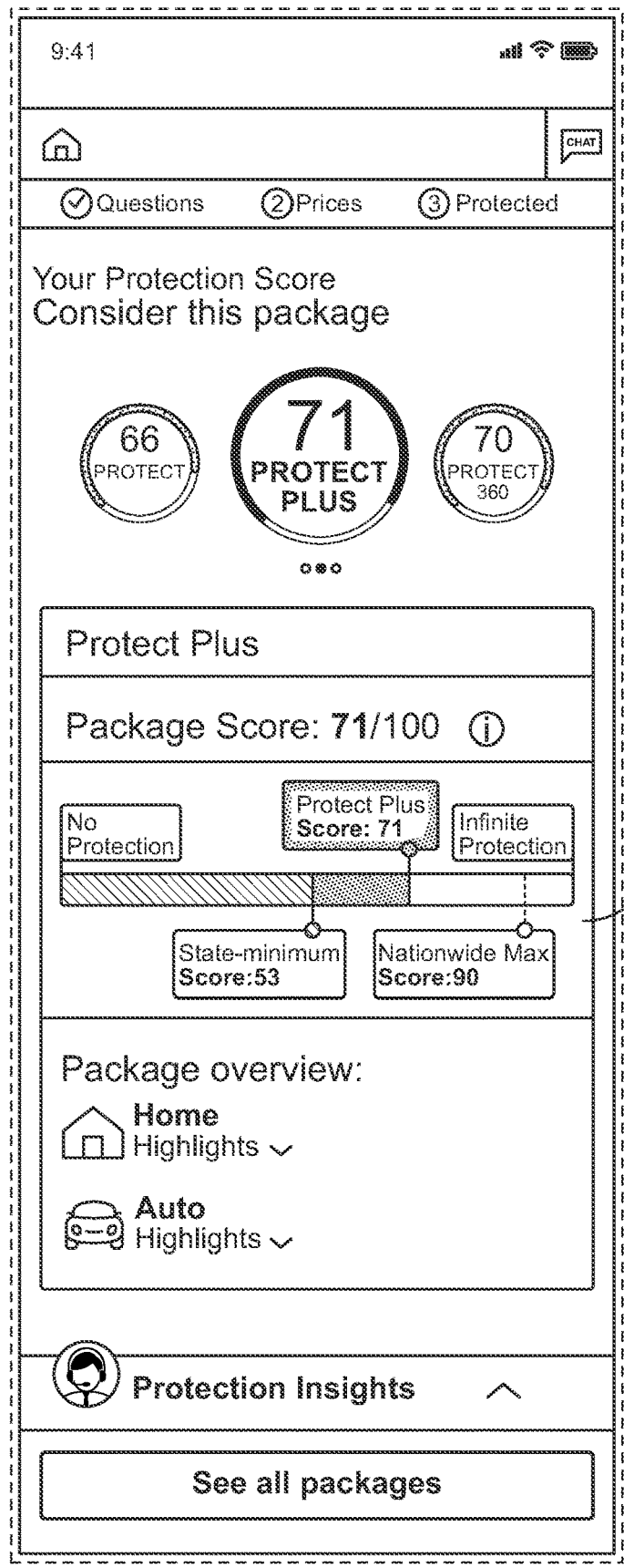

In some embodiments, the protection score displayed by dynamic display tool 1100 may be embodied as a qualitative protection score 1204 (see, for example, FIGS. 12A-12B). It should be appreciated that the qualitative protection score 1204 may include a categorical description (e.g., fair, good, great, exceptional) of the protection that the selected protection package provides to the user against out of pocket expenses due to an insurance event (see, for example, FIG. 12A). In some embodiments, the qualitative protection score 1204 may be embodied as a grading of selected protection package (see, for example, FIG. 12B). In other embodiments, however, the protection score displayed by the dynamic display tool 1100 may be embodied as a quantitative protection score 1206 (see, for example, FIGS. 12C-12E). In some embodiments, the quantitative protection score 1206 may be based out of 100 points (see, for example, FIG. 12C). In some embodiments, the quantitative protection score 1206 may be based out of 10 points (see, for example, FIG. 12D). Further, in some embodiments, the dynamic display tool 1100 may provide a comparison of the quantitative protection score 1206 and a minimum state required coverage plane that is scored using the same algorithm as the protection score described herein. In some embodiments, the dynamic display tool 1100 provides a gradient showing the quantitative protection score 1206 compared to a state required minimum coverage score and the protection scores generated based on the non-selected protection packages (see, for example, FIG. 12E). The quantitative protection score 1206 may be a protection score generated based on the selected protection package as described above.

In some embodiments, a user may opt-in or opt-out of various inclusions to the protection package. For example, the dynamic display tool 1100 may include options 1208 that allow a user to add or remove various inclusions that may affect the premium associated with the selected protection package. In some embodiments, upon selection of one or more options 1208, the protection package dynamically adjusts on the dynamic display tool 1100 (e.g., in real time). For example, in response to a user selection of one of the options 1208, the protection package (e.g., digital shortcut) may update in real-time based on the selected option.

Figure 13:
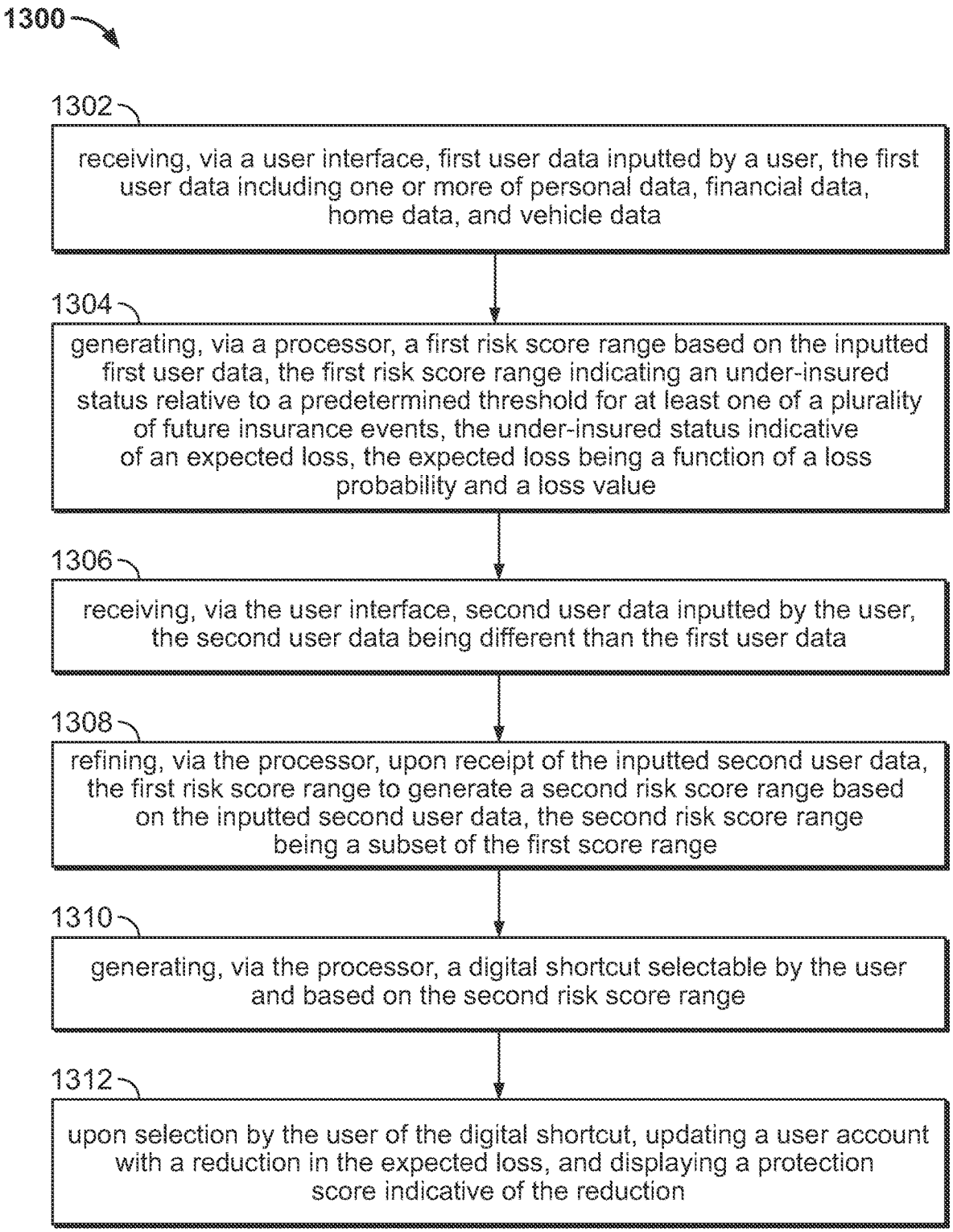
FIG. 13 is a simplified flow diagram of at least one embodiment of a method of generating and displaying a protection score for a user.

Referring now to FIG. 13 in use, the system 100 (e.g., the cloud-based system 102, the computing system 106 (e.g., the client device), and/or other computing devices described herein) may execute a method 1300 for generating and displaying a protection score for a user. It should be appreciated that the particular blocks of the method 1300 are illustrated by way of example, and such blocks may be combined or divided, added or removed, and/or reordered in whole or in part depending on the particular embodiment, unless stated to the contrary.

The illustrative method 1300 begins with flow 1302 in which the system 100 receives (e.g., via a user interface of the front end) first user data inputted by a user, the first user data including one or more of personal data, financial data, home data, and vehicle data. As described above, in some embodiments, the user interface may be a touch screen or a display screen. For example, the user interface may be display screen of an electronic device, such as a mobile device, computer, television, etc. The user may input the first user data into fields populated on the user interface. In some embodiments, the user interface pre-populates the first user data into the fields.

In block 1304, the system 100 (e.g., via a processor of the cloud-based system 102) generates a first risk score range based on the inputted first user data, the first risk score range indicating a probability that the user has an under-insured status relative to a predetermined threshold for at least one of a plurality of future insurance events, the under-insured status indicative of an expected loss, the expected loss being a function of a loss probability and a loss value. As described above, the plurality of insurance events may include bodily harm, collision (e.g., auto accident), comprehensive (e.g., comprehensive insurance), medical payments, or property damage (e.g., damage to a residence or home).

In block 1306, the system 100 receives (e.g., via the user interface of the front end) second user data inputted by the user, the second user data being different than the first user data. The user may update, refine, or add additional data based on incomplete or new information. In block 1308, upon receipt of the inputted second user data, the system 100 refines (e.g., via a processor of the cloud-based system 102) the first risk score range to generate a second risk score range based on the inputted second user data, the second risk score range being a subset of the first score range.

In block 1310, the system 100 generates (e.g., via a processor of the cloud-based system 102) a digital shortcut (e.g., corresponding with a protection package) for selection by the user and based on the second risk score range. In block 1312, upon selection by the user of the digital shortcut, the system 100 updates a user account with a reduction in the expected loss, and displays a protection score indicative of the reduction.

Although the flows 1302-1312 are described in a relatively serial manner, it should be appreciated that various blocks of the method 1300 may be performed in parallel in some embodiments.

What is claimed is:

1. A method of generating a digital shortcut, the method comprising:
   generating, by a content delivery network, web content including a user interface that provides a mechanism to a user for inputting user information;
   receiving, via the user interface, first user data, wherein the first user data includes (i) user data inputted by the user and (ii) user data associated with the user and retrieved from a profile data store, wherein the first user data is aggregated in a non-relational database, and wherein a serverless function of a cloud-based computing system is invoked to gather and process the first user data asynchronously, including pulling data from multiple sources in parallel to enable real-time updates to the user interface and wherein invoking the serverless function includes routing, by an application programming interface, a request to the serverless function in response to a corresponding event, allocating, in response to the request routed by the application programming interface, computing resources of the cloud-based computing system to execute one or more operations associated with the serverless function, and deallocating the resources after execution of the one or more operations to reduce consumption of the computing resources;
   generating, via the computing system, a first score range based on the first user data, the first score range indicating that a predetermined threshold value is not satisfied;
   receiving, via the user interface, second user data inputted by the user, the second user data being different from the first user data;
   refining, via the computing system and in response to receipt of the inputted second user data, the first score range to generate a second score range based on the inputted second user data, the second score range being a subset of the first score range;
   generating, via the computing system, a digital shortcut selectable by the user via the user interface and based on the second score range;
   receiving, via the user interface, a user selection of the digital shortcut, wherein the user selection is processed asynchronously in real time via a queueing architecture without awaiting a response from the computing system;
   updating, in real time in response to selection of the digital shortcut by the user, user data stored in association with a user account based on the selection of the digital shortcut by the user; and
   displaying, via the user interface, an updated weighted score dynamically in real time in response to and based in part on the selection of the digital shortcut by the user.

2. The method of claim 1, further comprising generating, via the computing system, a plurality of digital shortcuts for selection by the user, the one or more digital shortcuts being based on at least one of the first score and the second score and being associated with alternative updates to the user data stored in association with the user account.

3. The method of claim 1, further comprising:
   receiving, via the user interface, third user data inputted by the user, the third user data being different than the first user data and the second user data; and
   refining, via the computing system and in response to receipt of the inputted third user data, the second score range to generate a score value based on the inputted third user data, the score value being an element of the second score range.

4. The method of claim 1, wherein the digital shortcut and the updated weighted score are simultaneously displayed on the user interface.

5. A system of generating a digital shortcut, the system comprising:
- at least one processor; and
- at least one memory comprising a plurality of instructions stored thereon that, in response to execution by the at least one processor, causes the system to:
  - receive first user data that includes (i) user data inputted by a user and (ii) user data associated with the user and retrieved from a profile data store, wherein the first user data is aggregated in a non-relational database, and wherein a serverless function of a cloud-based system is invoked to gather and process the first user data asynchronously, wherein the system is configured to pull data from multiple sources in parallel to enable real-time updates to the user interface and wherein to invoke the serverless function includes to route, by an application programming interface, a request to the serverless function in response to a corresponding event, allocate, in response to the request routed by the application programming interface, computing resources of the cloud-based computing system to execute one or more operations associated with the serverless function, and deallocate the resources after execution of the one or more operations to reduce consumption of the computing resources;
  - generate a first score range based on the inputted first user data, the first score range indicating that a predetermined threshold is not satisfied;
  - receive second user data inputted by the user, the second user data being different from the first user data;
  - refine, in response to receipt of the inputted second user data, the first score range to generate a second score range based on the inputted second user data, the second score range being a subset of the first score range;
  - generate a digital shortcut selectable by the user and based on the second score range;
  - receive a user selection of the digital shortcut, wherein the user selection is processed asynchronously in real time via a queueing architecture without awaiting a response from the cloud-based system;
  - update, in real time and in response to selection of the digital shortcut by the user, user data stored in association with a user account based on the selection of the digital shortcut by the user; and
  - display an updated weighted score dynamically and in real time via a user interface in response to and based in part on the selection of the digital shortcut by the user.

6. The system of claim 5, wherein the plurality of instructions further causes the system to generate a plurality of digital shortcuts for selection by the user, the one or more digital shortcuts being based on at least one of the first score and the second score and being associated with alternative updates to the user data stored in association with the user account.

7. The system of claim 5, wherein the plurality of instructions further causes the system to:
- receive third user data inputted by the user, the third user data being different than the first user data and the second user data; and
- refine, in response to receipt of the inputted third user data, the second score range to generate a score value based on the inputted third user data, the score value being an element of the second score range.

8. The system of claim 5, wherein the digital shortcut and the updated weighted score are simultaneously displayed on the user interface.

9. A system of generating a digital shortcut, the system comprising:
- a content delivery network configured to generate web content including a user interface that provides a mechanism to a user for inputting user information;
- a cloud-based system; and
- a client device configured to (i) receive first user data that includes user data inputted by a user and user data associated with the user and retrieved from a profile data store, and (ii) receive second user data inputted by the user, the second user data being different from the first user data, wherein the first user data and the second user data are aggregated in a non-relational database, and wherein the client device invokes a serverless function of the cloud-based system to gather and process the first user data and the second user data asynchronously
- wherein the cloud-based system is configured to pull data from multiple sources in parallel to enable real-time updates to the user interface and wherein invocation of the serverless function includes to route, by an application programming interface, a request to the serverless function in response to a corresponding event, allocate, in response to the request routed by the application programming interface, computing resources of the cloud-based computing system to execute one or more operations associated with the serverless function, and deallocate the resources after execution of the one or more operations to reduce consumption of the computing resources;
- wherein the cloud-based system is further configured to (i) generate a first score range based on the first user data, the first score range indicating that a predetermined threshold value is not satisfied, (ii) refine, in response to receipt of the inputted second user data, the first score range to generate a second score range based on the inputted second user data, the second score range being a subset of the first score range, (iii) generate a digital shortcut selectable by the user via the user interface of the client device and based on the second score range, and (iv) update, in real time in response to selection of the digital shortcut by the user, user data stored in association with a user account based on the selection of the digital shortcut by the user; and
- wherein the client device is further configured to display an updated weighted score via the user interface of the client device dynamically in real time in response to and based in part on the selection of the digital shortcut by the user.

10. The system of claim 9, wherein the cloud-based system is further configured to generate a plurality of digital shortcuts for selection by the user, the one or more digital shortcuts being based on at least one of the first score and the second score and being associated with alternative updates to the user data stored in association with the user account.

11. The system of claim 9, wherein the client device is further configured to receive third user data inputted by the user, the third user data being different than the first user data and the second user data; and wherein the cloud-based system is further configured to refine, in response to receipt of the inputted third user data, the second score range to generate a score value based on the inputted third user data, the score value being an element of the second score range.

12. The system of claim 9, wherein the digital shortcut and the updated weighted score are simultaneously displayed on the user interface.

* * * * *